US009666070B2

(12) United States Patent
Otake

(10) Patent No.: US 9,666,070 B2
(45) Date of Patent: *May 30, 2017

(54) DRIVE ASSISTING DEVICE

(75) Inventor: Hirotada Otake, Sunto-gun (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 329 days.

This patent is subject to a terminal disclaimer.

(21) Appl. No.: 14/376,228

(22) PCT Filed: Feb. 7, 2012

(86) PCT No.: PCT/JP2012/052767
§ 371 (c)(1),
(2), (4) Date: Aug. 1, 2014

(87) PCT Pub. No.: WO2013/118256
PCT Pub. Date: Aug. 15, 2013

(65) Prior Publication Data
US 2014/0379213 A1  Dec. 25, 2014

(51) Int. Cl.
*G06F 7/00* (2006.01)
*G08G 1/0967* (2006.01)
(Continued)

(52) U.S. Cl.
CPC ......... *G08G 1/096716* (2013.01); *B60K 6/00* (2013.01); *B60K 6/48* (2013.01);
(Continued)

(58) Field of Classification Search
CPC ............. B60T 13/586; B60T 2201/022; B60T 2210/36; B60T 7/00; B60T 7/042;
(Continued)

(56) References Cited

U.S. PATENT DOCUMENTS 8,185,296 B2 * 5/2012 Yokoyama ............ G08G 1/052
701/117
9,202,378 B2 * 12/2015 Otake .................... G08G 1/166
(Continued)

FOREIGN PATENT DOCUMENTS

JP  2007-24599 A  2/2007
JP  2009-126503 A  6/2009
(Continued)

OTHER PUBLICATIONS

Notice of Allowance mailed Apr. 27, 2015 in co-pending U.S. Appl. No. 14/131,140.

*Primary Examiner* — Harry Oh
(74) *Attorney, Agent, or Firm* — Oblon, McClelland, Maier & Neustadt, L.L.P.

(57) ABSTRACT

A drive assisting device includes an assisting device capable of outputting a driving assistance information for assisting driving a vehicle; and an assistance control device configured to control the assisting device and capable of changing a form of the driving assistance information at a period from a first assistance timing to a second assistance timing after the first assistance timing and at a period after the second assistance timing. Then, one of the first assistance timing and the second assistance timing is determined based on a target traveling state amount of the vehicle at a predetermined position, and the other of the first assistance timing and the second assistance timing is determined based on one of the first assistance timing and the second assistance timing, so that the driving assistance operation can be appropriately performed.

20 Claims, 11 Drawing Sheets

(51) Int. Cl.
*G08G 1/0962* (2006.01)
*B60T 7/00* (2006.01)
*B60K 6/00* (2006.01)
*B60T 8/00* (2006.01)
*B60K 6/48* (2007.10)
*B60T 1/10* (2006.01)
*B60T 7/04* (2006.01)
*B60T 7/18* (2006.01)
*B60T 7/22* (2006.01)
*B60T 13/58* (2006.01)
*B60W 20/10* (2016.01)
*B60W 30/18* (2012.01)
*B60W 50/14* (2012.01)

(52) U.S. Cl.
CPC *B60T 1/10* (2013.01); *B60T 7/00* (2013.01); *B60T 7/042* (2013.01); *B60T 7/18* (2013.01); *B60T 7/22* (2013.01); *B60T 8/00* (2013.01); *B60T 13/586* (2013.01); *B60W 20/10* (2013.01); *G08G 1/09626* (2013.01); *G08G 1/096758* (2013.01); *G08G 1/096783* (2013.01); *G08G 1/096791* (2013.01); *B60T 2201/022* (2013.01); *B60T 2210/36* (2013.01); *B60T 2270/604* (2013.01); *B60W 30/18109* (2013.01); *B60W 2050/146* (2013.01); *Y02T 10/6221* (2013.01); *Y02T 10/7258* (2013.01)

(58) Field of Classification Search
CPC ... B60T 8/00; B60W 2050/146; B60W 20/10; B60W 30/18109; G08G 1/09626; G08G 1/096716; G08G 1/096758; G08G 1/096783; G08G 1/096791; Y02T 10/7258

USPC .......................................................... 701/36
See application file for complete search history.

(56) References Cited

U.S. PATENT DOCUMENTS

| 2005/0128063 | A1* | 6/2005 | Isaji ...................... B60W 10/06 340/439 |
| 2006/0293819 | A1* | 12/2006 | Harumoto ........... B60W 40/072 701/41 |
| 2009/0076698 | A1* | 3/2009 | Yokoyama ................ B60T 7/22 701/70 |
| 2011/0093178 | A1* | 4/2011 | Yamada ........... G08G 1/096716 701/70 |
| 2011/0260886 | A1* | 10/2011 | Nagura .................. G08G 1/081 340/905 |
| 2014/0142797 | A1* | 5/2014 | Otake ................... B60W 20/00 701/22 |

FOREIGN PATENT DOCUMENTS

| JP | 2009-244167 A | 10/2009 |
| JP | 2010-9138 A | 1/2010 |
| JP | 2010-244308 A | 10/2010 |
| JP | 2011-088551 A | 5/2011 |
| JP | 2011-121509 A | 6/2011 |
| JP | 2011-129139 A | 6/2011 |
| JP | 2011-141802 A | 7/2011 |
| WO | WO 2013/018198 A1 | 2/2013 |

* cited by examiner

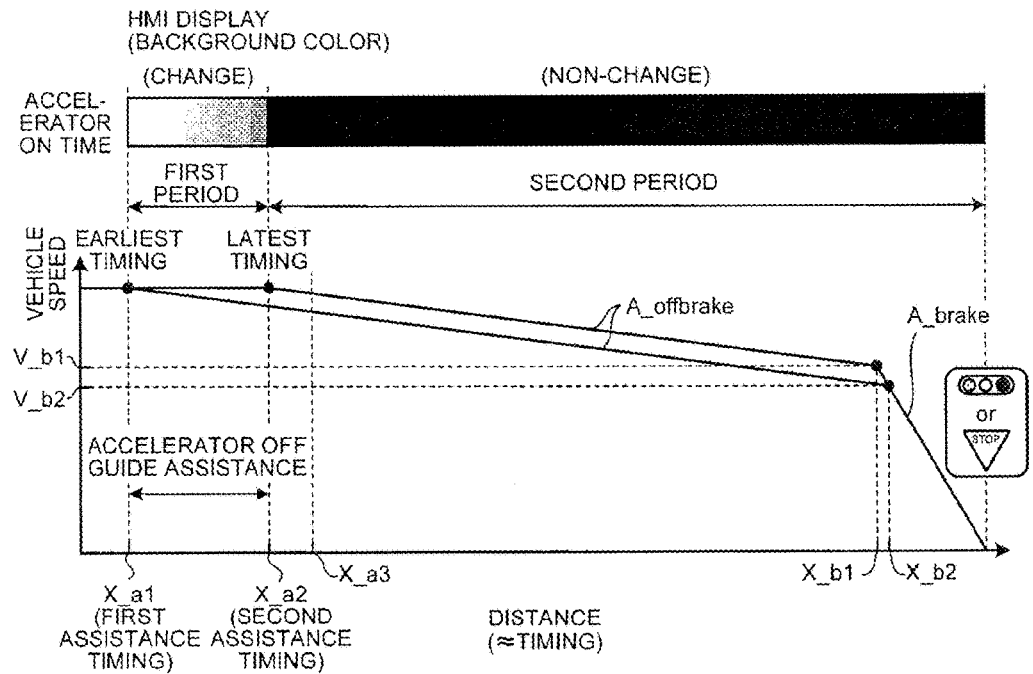
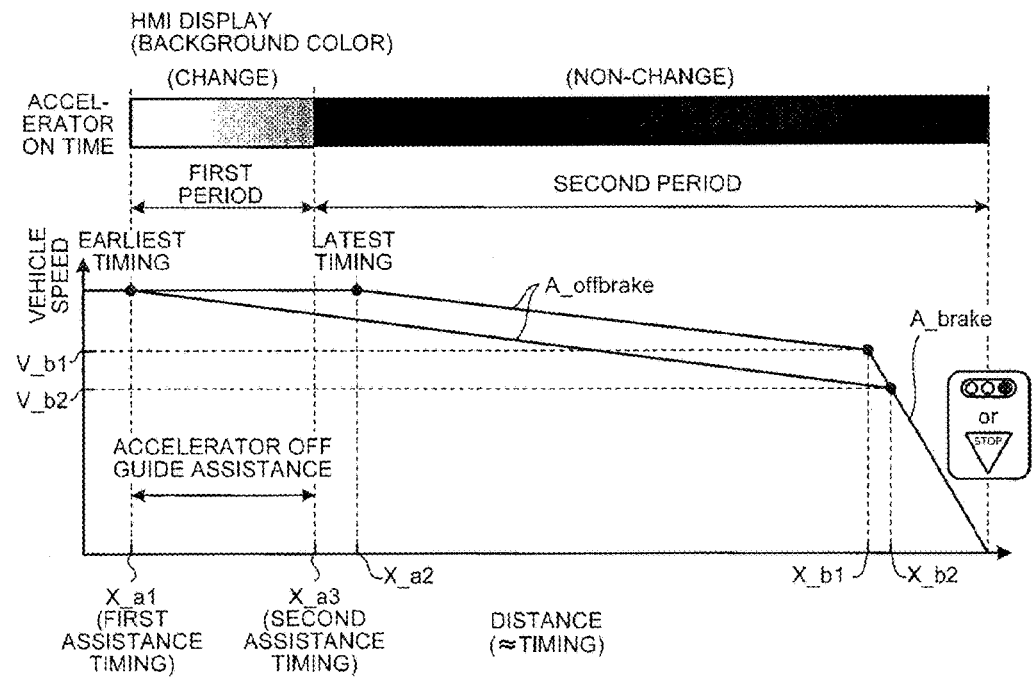

DRIVE ASSISTING DEVICE

FIELD

The present invention relates to a drive assisting device.

BACKGROUND

Hitherto, there is known a drive assisting device that is mounted on a vehicle and outputs information for assisting a driver's operation of driving the vehicle. As such a drive assisting device, for example, Patent Literature 1 discloses a device that notifies a timing at which the vehicle needs to be decelerated to the driver when the vehicle needs to be stopped with respect to a traffic light based on the time at which the vehicle reaches the traffic light and the time at which a signaling lamp color changes.

CITATION LIST

Patent Literature

Patent Literature 1: Japanese Patent Application Laid-open No. 2010-244308

SUMMARY

Technical Problem

Incidentally, the above-described device disclosed in Patent Literature 1 performs an assistance operation of urging the driver to decelerate the vehicle at the early timing by notifying the timing at which the vehicle needs to be decelerated to the driver when the vehicle needs to be stopped with respect to the traffic light. However, this device can be further improved, for example, when the more appropriate driving assistance operation is suggested.

The present invention is made in view of the above-described circumstances, and an object thereof is to provide a drive assisting device capable of appropriately assisting a driving.

Solution to Problem

In order to achieve the above mentioned object, a drive assisting device according to the present invention includes an assisting device capable of outputting driving assistance information for assisting driving of a vehicle; and an assistance control device configured to control the assisting device and capable of changing a form of the driving assistance information at a period from a first assistance timing to a second assistance timing after the first assistance timing and at a period after the second assistance timing, wherein one of the first assistance timing and the second assistance timing is determined based on a target traveling state amount of the vehicle at a predetermined position of the vehicle, and the other of the first assistance timing and the second assistance timing is determined based on one of the first assistance timing and the second assistance timing.

Further, in the drive assisting device, it is possible to configure that one of the first assistance timing and the second assistance timing is determined based on the target traveling state amount at a predetermined position with respect to a current traveling state amount of the vehicle.

Further, in the drive assisting device, it is possible to configure that the assistance control device controls the assisting device based on the target traveling state amount of the vehicle at a predetermined position of the vehicle, and the assisting device outputs the driving assistance information to perform a driving assistance operation of urging a recommended driving operation so that the traveling state amount of the vehicle at a predetermined position becomes the target traveling state amount.

Further, in the drive assisting device, it is possible to configure that the first assistance timing is an earliest timing at which the traveling state amount of the vehicle at a predetermined position becomes the target traveling state amount at an earliest time by performing the recommended driving operation, and the second assistance timing is an earlier timing of the latest timing at which the traveling state amount of the vehicle at a predetermined position becomes the target traveling state amount at a latest time by performing the recommended driving operation and a timing at which a predetermined time set in advance is added to the first assistance timing.

Further, in the drive assisting device, it is possible to configure that the second assistance timing is an latest timing at which the traveling state amount of the vehicle at a predetermined position becomes the target traveling state amount at an latest time by performing the recommended driving operation, and the first assistance timing is a later timing of the earliest timing at which the traveling state amount of the vehicle at a predetermined position becomes the target traveling state amount at the earliest time by performing the recommended driving operation and a timing at which a predetermined time set in advance is subtracted from the second assistance timing.

Further, in the drive assisting device, it is possible to configure that the target traveling state amount is a recommended vehicle speed at which a brake request operation with respect to the vehicle is recommended, and the earliest timing and the latest timing are calculated based on the recommended vehicle speed, a deceleration speed at the time of canceling the vehicle operation of the vehicle in a state where an acceleration request operation and the brake request operation with respect to the vehicle are canceled, and a target deceleration speed of the vehicle at the time the brake request operation is performed.

Further, in the drive assisting device, it is possible to configure that the earliest timing and the latest timing are calculated based on a different recommended vehicle speed based on the current vehicle speed of the vehicle, the same target deceleration speed of the vehicle, and the same deceleration speed at the time of canceling the vehicle operation to a predetermined position.

Further, in the drive assisting device, it is possible to configure that the earliest timing is calculated based on a first predetermined position obtained in response to a lower-limit value of the recommended vehicle speed based on the current vehicle speed of the vehicle and the target deceleration speed of the vehicle, and on the deceleration speed at the time of canceling the vehicle operation to the first predetermined position, and the latest timing is calculated based on a second predetermined position different from the first predetermined position obtained in response to an upper-limit value of the recommended vehicle speed based on the current vehicle speed of the vehicle and the target deceleration speed of the vehicle, and on the deceleration speed at the time of canceling the vehicle operation to the first predetermined position.

Further, in the drive assisting device, it is possible to configure that the earliest timing and the latest timing are calculated based on the same recommended vehicle speed based on the current vehicle speed of the vehicle, the same target deceleration speed of the vehicle, and the different deceleration speed at the time of canceling the vehicle operation to a predetermined position.

Further, in the drive assisting device, it is possible to configure that the earliest timing is calculated based on a predetermined position obtained in response to the recommended vehicle speed based on the current vehicle speed of the vehicle and the target deceleration speed of the vehicle, and on a deceleration speed at the time of canceling a first operation of the vehicle to the predetermined position, and the latest timing is calculated based on a predetermined position obtained in response to the recommended vehicle speed based on the current vehicle speed of the vehicle and the target deceleration speed of the vehicle, and on a deceleration speed at the time of canceling a second operation of the vehicle to the predetermined position having an absolute value larger than that of deceleration speed at the time of canceling the first operation of the vehicle.

Further, in the drive assisting device, it is possible to configure that the assistance control device changes the form of the driving assistance information with time at the period from the first assistance timing to the second assistance timing.

Further, in the drive assisting device, it is possible to configure that the vehicle is a hybrid vehicle that includes an internal combustion engine and a motor as a travel driving source.

Advantageous Effects of Invention

The drive assisting device according to the present invention has an effect that the driving can be appropriately assisted.

BRIEF DESCRIPTION OF DRAWINGS

FIG. 4 is a schematic diagram illustrating a relation between a vehicle speed and a remaining distance to a stop position and an example of an assistance form in the vehicle control system according to the first embodiment.

FIG. 5 is a schematic diagram illustrating a relation between the vehicle speed and the remaining distance to the stop position and an example of the assistance form in the vehicle control system according to the first embodiment.

DESCRIPTION OF EMBODIMENTS

Hereinafter, embodiments according to the present invention will be described in detail with reference to the drawings. Furthermore, the present invention is not limited to the embodiments. Further, the components of the embodiments below include a component that can be easily substituted by the person skilled in the art or the substantially same component.

First Embodiment

Figure 1:
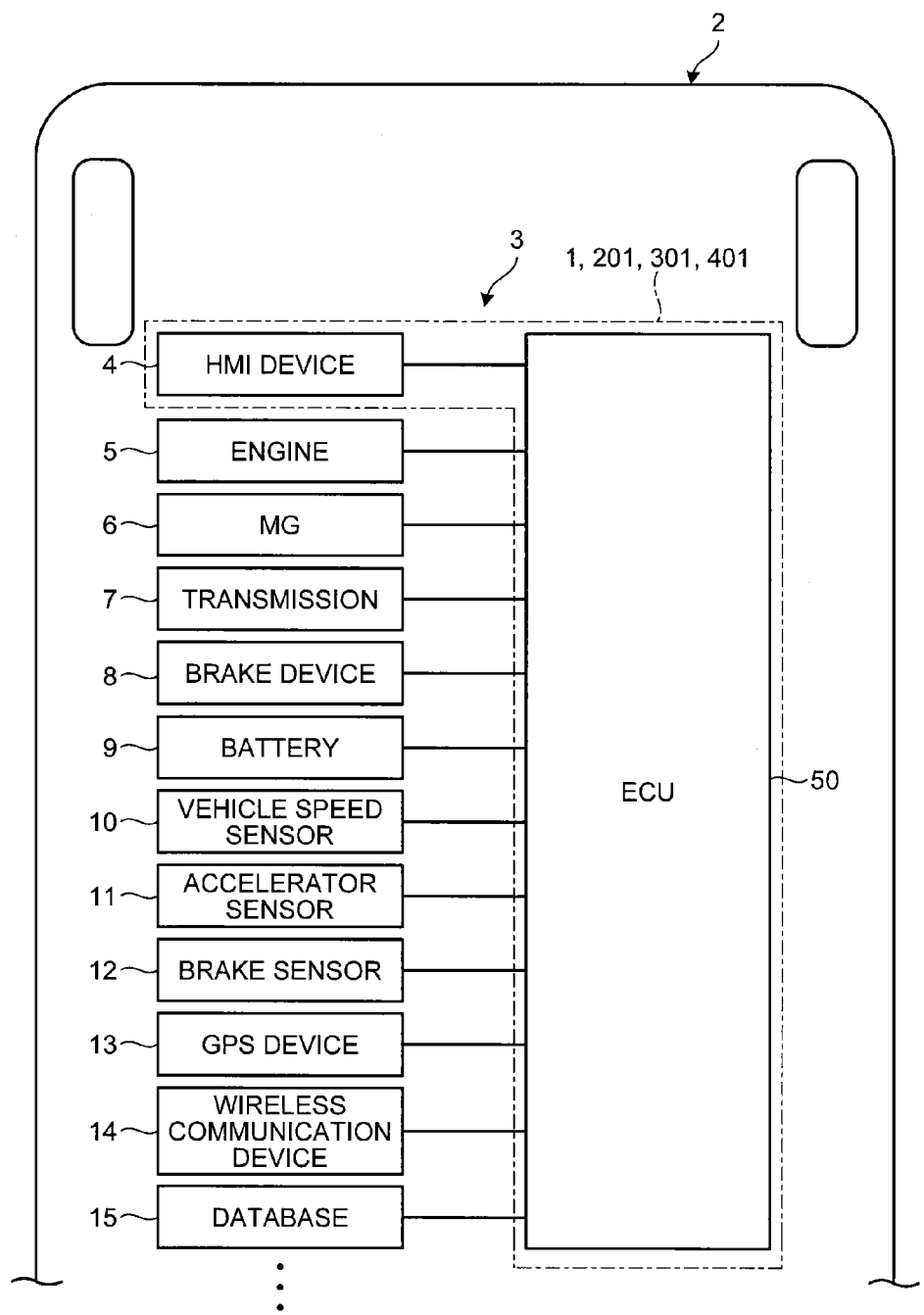
FIG. 1 is a schematic configuration diagram illustrating a vehicle control system according to a first embodiment.
Figure 2:
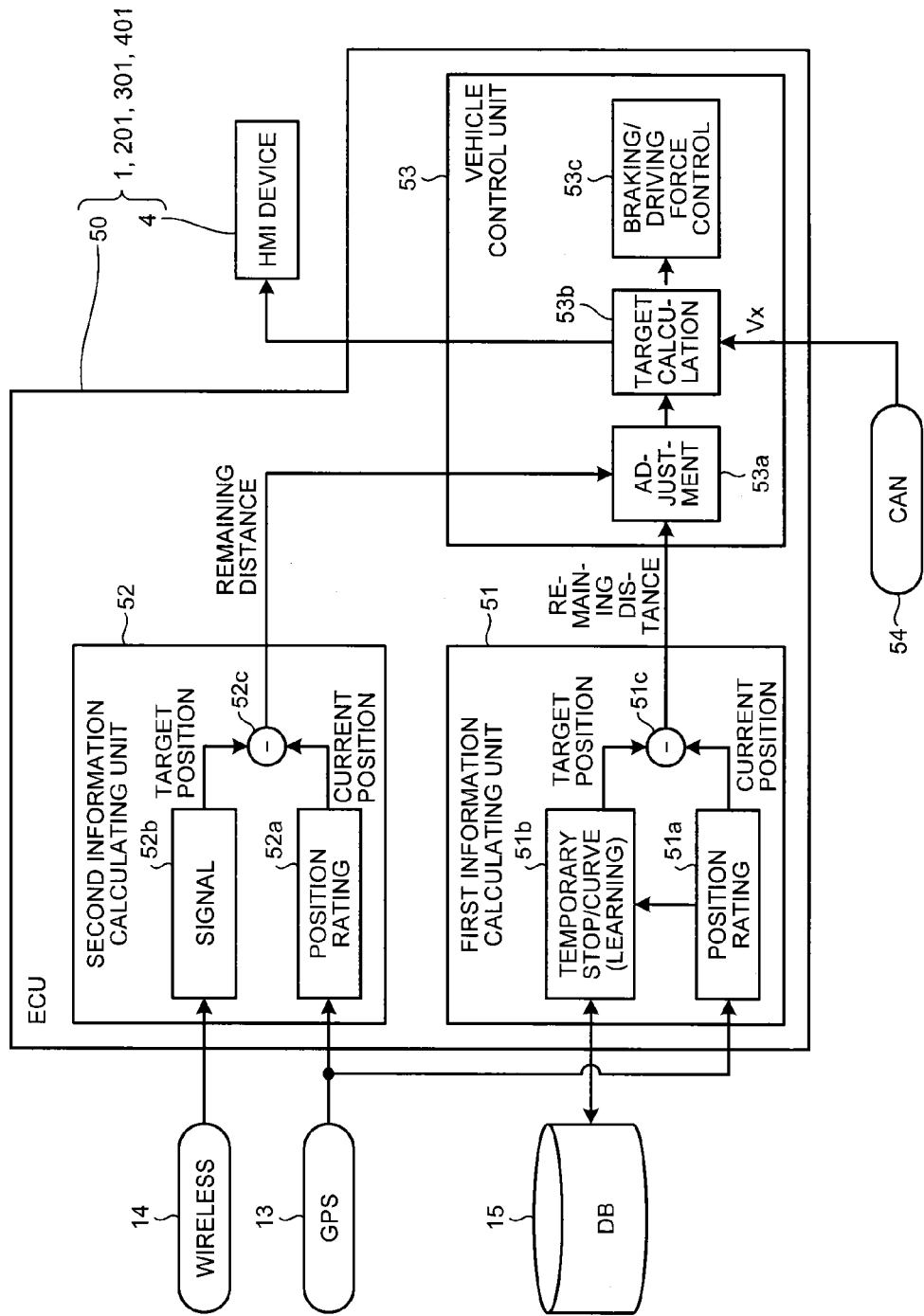
FIG. 2 is a block diagram illustrating an example of a schematic configuration of an ECU according to the first embodiment.
Figure 3:
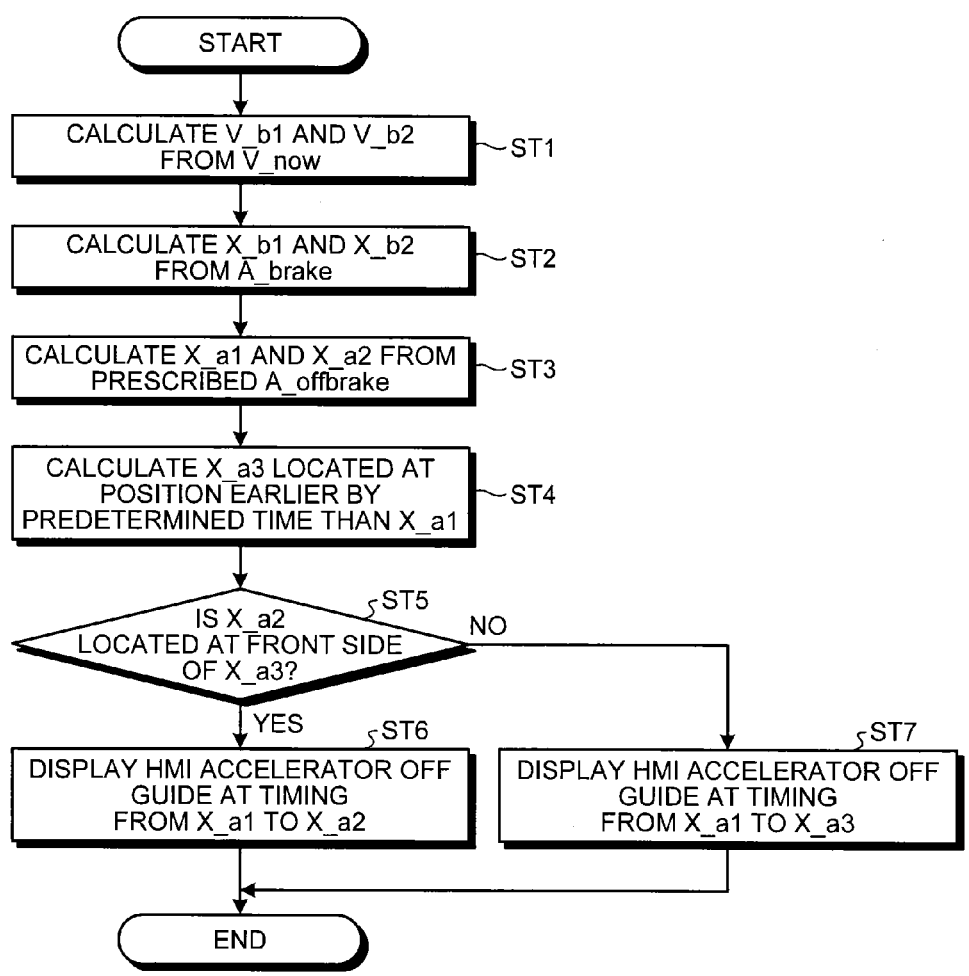
FIG. 3 is a flowchart illustrating an example of a control by the ECU according to the first embodiment.
Figure 6:
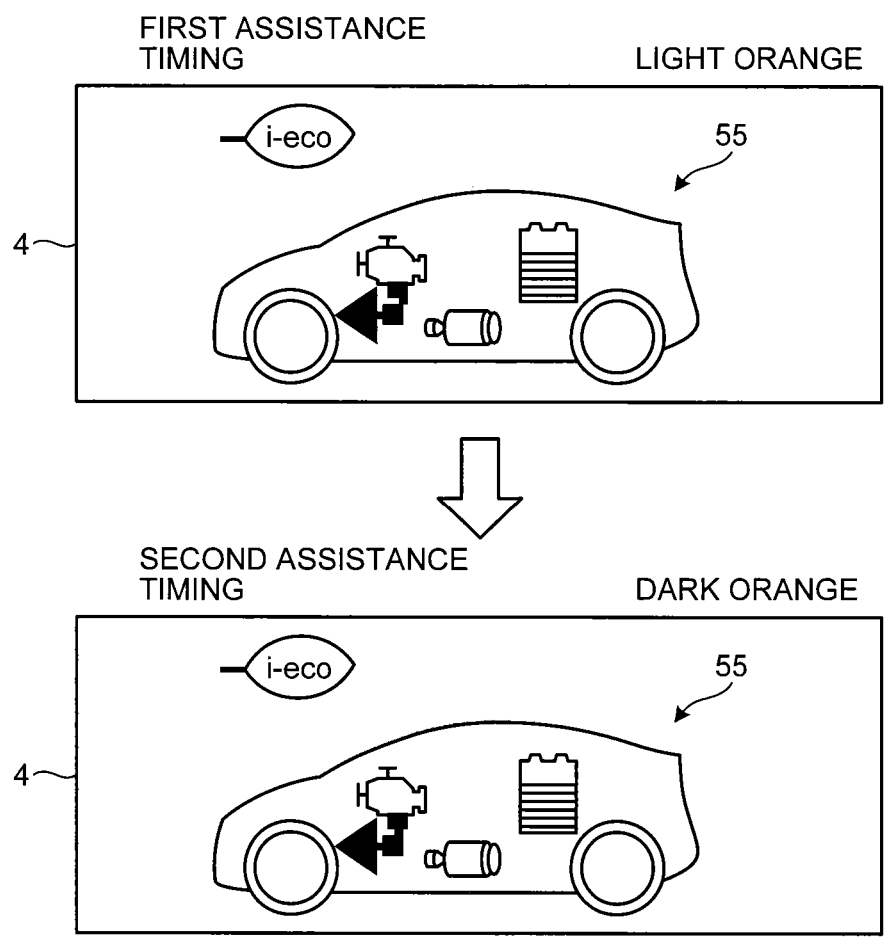
FIG. 6 is a schematic diagram illustrating an example of an assistance display form by a HMI device according to the first embodiment.

FIG. 1 is a schematic configuration diagram illustrating a vehicle control system according to a first embodiment, FIG. 2 is a block diagram illustrating an example of a schematic configuration of an ECU according to the first embodiment, FIG. 3 is a flowchart illustrating an example of a control by the ECU according to the first embodiment, FIGS. 4 and 5 are schematic diagrams illustrating a relation between a vehicle speed and a remaining distance to a stop position and an example of an assistance form in the vehicle control system according to the first embodiment, and FIG. 6 is a schematic diagram illustrating an example of an assistance display form by a HMI device according to the first embodiment.

As illustrated in FIG. 1, a drive assisting device 1 of the embodiment is applied to a vehicle control system 3 mounted on a vehicle 2. The drive assisting device 1 includes a HMI (Human Machine Interface) device (hereinafter, referred to as a "HMI" in some cases) 4 that serves as an assisting device and an ECU (Electronic Control Unit) 50. Then, the drive assisting device 1 assists an operation in which a driver drives the vehicle 2 in a manner such that the ECU 50 controls the HMI device 4 in accordance with a situation and outputs various driving assistance information.

The vehicle control system 3 that employs the drive assisting device 1 of the embodiment is an estimation information eco driving assistance system that utilizes so-called estimation information. That is, the vehicle control system 3 assists the driver's ecological driving (eco drive) in a manner such that the drive assisting device 1 urges the driver to perform a driving capable of improving the fuel economy by utilizing the estimation information. Thus, the vehicle control system 3 is a system that improves the fuel economy by suppressing the fuel consumption. Typically, the drive assisting device 1 guides and assists the driver's operation by outputting the driving assistance information for the purpose of assisting the driver's eco driving.

Further, the vehicle control system 3 of the embodiment is also a so-called hybrid system that sets the combination of an engine 5 and a MG 6 as a travel driving source for rotationally driving the driving wheel of the vehicle 2. That is, the vehicle 2 is a hybrid vehicle that includes the MG 6 as the travel driving source in addition to the engine 5. The vehicle 2 is configured to improve the fuel economy in a manner such that the engine 5 is operated with high efficiency as much as possible, the excess and deficiency of the power or the engine brake force is complemented by the MG 6 as the rotation motor, and the energy is regenerated in the deceleration state.

Furthermore, in the description below, the vehicle control system 3 is described as the hybrid system that includes the engine 5 and the MG 6 as the travel driving source, but the present invention is not limited thereto. The vehicle control system 3 may be a system that includes only the engine 5 as the travel driving source except for the MG 6 or a system that includes only the MG 6 as the travel driving source except for the engine 5.

Specifically, the vehicle control system 3 includes the HMI device 4, the engine 5 as an internal combustion engine, the motor generator (hereinafter, referred to as a "MG" in some cases) 6 as a motor, a transmission 7, a brake device 8, a battery 9, and the like. Further, the vehicle control system 3 includes a vehicle speed sensor 10, an accelerator sensor 11, a brake sensor 12, a GPS (Global Positioning System) device (hereinafter, referred to as a "GPS" in some cases) 13, a wireless communication device 14, a database (hereinafter, referred to as a "DB" in some cases) 15, and the like.

The HMI device 4 is an assisting device capable of outputting driving assistance information as information for assisting the operation of driving the vehicle 2, and is a device that provides the driving assistance information and the like for the driver. The HMI device 4 is an in-vehicle device, and includes, for example, a display device (visual information display device) or a speaker (sound output device) provided inside the vehicle compartment of the vehicle 2. As the HMI device 4, a display device or a speaker of an existing device, for example, a navigation system may be used. The HMI device 4 guides the driver's driving by providing information based on voice information, visual information (figure information and text information), and the like so as to realize the improvement in fuel economy. The HMI device 4 assists the driver's driving by the provided information so that the target value is realized. The HMI device 4 is electrically connected to the ECU 50, and is controlled by the ECU 50. Furthermore, the HMI device 4 may include, for example, a touch sensation information output device that outputs touch sensation information involved with a handle vibration, a seat vibration, a pedal reaction force, and the like.

The vehicle control system 3 is equipped with the engine 5, the MG 6, the transmission 7, the brake device 8, the battery 9, and the like as various actuators for realizing the travel operation of the vehicle 2.

The engine 5 exerts a driving force on the vehicle wheel of the vehicle 2 in response to, the driver's acceleration request operation, for example, the accelerator pedal stepping operation. The engine 5 generates an engine torque serving as an engine torque as the traveling power to be exerted on the driving wheel of the vehicle 2 by consuming fuel. That is, the engine 5 is a heat engine that outputs heat energy generated by the combustion of fuel into mechanical energy such as a torque, and an example thereof includes a gasoline engine, a diesel engine, an LPG engine, or the like.

The engine 5 includes, for example, a fuel injection device, an ignition device, and a throttle valve device (not illustrated), and these devices are controlled by the ECU 50 while being electrically connected to the ECU 50. The output torque of the engine 5 is controlled by the ECU 50. Furthermore, the power generated by the engine 5 can be used to generate power in the MG 6.

The MG 6 causes a driving force to be exerted on the vehicle wheel of the vehicle 2 in response to the driver's acceleration request operation, for example, the accelerator pedal stepping operation. The MG 6 generates a motor torque as the traveling power exerted on the driving wheel of the vehicle 2 by converting electric energy into mechanical power. The MG 6 is a so-called rotation motor that includes a stator as a fixed member and a rotor as a rotation member. The MG 6 serves as not only a motor that converts the electric energy into the mechanical power and outputs the mechanical power, but also a generator that converts the mechanical power into the electric energy and collects the electric energy. That is, the MG 6 has a function (a power running function) of a motor that is driven by the electric power supplied thereto, converts the electric energy into the mechanical energy, and outputs the mechanical energy and a function (a regeneration function) of a generator that converts the mechanical energy into the electric energy. The MG 6 is electrically connected to the ECU 50 via an inverter or the like that converts a DC current and an AC current, and is controlled by the ECU 50. The output torque and the generation amount of the MG 6 are controlled by the ECU 50 via the inverter.

The transmission 7 is a power transmission device that transmits the rotation output generated by the engine 5 or the MG 6 to the driving wheel of the vehicle 2 by changing the speed thereof. The transmission 7 may be a so-called manual transmission (MT) or may be a so-called automatic transmission such as a stepped automatic transmission (AT), a continuously variable transmission (CVT), a multi-mode manual transmission (MMT), a sequential manual transmission (SMT), and a dual clutch transmission (DCT). Here, the transmission 7 will be described as the continuously variable transmission that uses, for example, a planetary gear mechanism or the like. The transmission 7 is controlled by the ECU 50 while the transmission actuator and the like thereof are electrically connected to the ECU 50.

The brake device 8 causes a braking force to be exerted on the vehicle wheel of the vehicle 2 in response to the driver's brake request operation, for example, the brake pedal stepping operation. The brake device 8 applies a braking force to the vehicle wheel that is rotatably supported by the vehicle body of the vehicle 2 by generating a predetermined friction force (friction resistance force) between, for example, friction components such as a brake pad or a brake disc. Thus, the brake device 8 can brake the vehicle 2 by generating a braking force in the ground contact surface of the vehicle wheel of the vehicle 2 with respect to the road surface. The brake device 8 is controlled by the ECU 50 while the brake actuator and the like are electrically connected to the ECU 50.

The battery 9 is an electrical storage device that can store the electric power and discharge the stored electric power. The battery 9 is electrically connected to the ECU 50, and outputs signals on various information to the ECU 50.

In a case where the MG 6 serves as a motor, the electric power stored in the battery 9 is supplied through an inverter, and the electric power supplied thereto is output while being converted into the traveling power of the vehicle 2. Further, in a case where the MG 6 serves as a generator, the MG 6 is driven by the power input thereto so as to generate electric power, and the generated electric power is charged into the battery 9 via an inverter. At this time, the MG 6 can brake (regeneratively brake) the rotation of the rotor by the rotation resistance generated by the rotor. As a result, the MG 6 can generate a motor regeneration torque as a negative motor torque in the rotor by the regeneration of the electric power in a regenerative brake state, so that a braking force can be applied to the driving wheel of the vehicle 2. That is, the vehicle control system 3 can recycle the movement energy of the vehicle 2 as the electric energy in a manner such that the mechanical power is input from the driving wheel of the vehicle 2 to the MG 6 and the electric power is generated by the regeneration of the MG 6. Then, the vehicle control system 3 can accordingly perform the regenerative brake operation by the MG 6 in a manner such that the mechanical power (the negative motor torque) generated in the rotor of the MG 6 is transmitted to the driving wheel. In this case, in the vehicle control system 3, when the regeneration amount (the generation amount) obtained by the MG 6 is set to be relatively small, the generated braking force relatively decreases, and the deceleration speed acting on the vehicle 2 relatively decreases. Meanwhile, in the vehicle control system 3, the regeneration amount (the generation amount) obtained by the MG 6 is set to be relatively large, the generated braking force relatively increases, and the deceleration speed acting on the vehicle 2 relatively increases.

The vehicle speed sensor 10, the accelerator sensor 11, and the brake sensor 12 are detection devices that detect the traveling state of the vehicle 2 or the input (the driver input) from the driver to the vehicle 2, that is, the actual state amount or the actual physical amount with respect to the vehicle 2 input from the driver. The vehicle speed sensor 10 detects the vehicle speed of the vehicle 2 (hereinafter, referred to as the "vehicle speed" in some cases). The accelerator sensor 11 detects the accelerator opening degree as the operation amount (the stepping amount) of the accelerator pedal performed by the driver. The brake sensor 12 detects the driver's brake pedal operation amount (stepping amount), for example, the master cylinder pressure or the like. The vehicle speed sensor 10, the accelerator sensor 11, and the brake sensor 12 are electrically connected to the ECU 50, and output the detection signals to the ECU 50.

The GPS device 13 is a device that detects the current position of the vehicle 2. The GPS device 13 receives a GPS signal output from a GPS satellite and calculates GPS information (the X coordinate; X and the Y coordinate; Y) as the position information of the vehicle 2 based on the received GPS signal while measuring the position of the vehicle. The GPS device 13 is electrically connected to the ECU 50, and outputs a signal involved with the GPS information to the ECU 50.

The wireless communication device 14 is an estimation information acquiring device that acquires the estimation information on the traveling state of the vehicle 2 by using the wireless communication. The wireless communication device 14 acquires the estimation information via the wireless communication from a device that transmits and receives information with respect to, for example, a road-vehicle communication device (a road-side device) such as an optical beacon provided near a road, a vehicle-vehicle communication device provided in the other vehicle, a VICS (trademark) (Vehicle Information and Communication System) center, and the like via a communication infra such as an internet. The wireless communication device 14 acquires, for example, precedent vehicle information, subsequent vehicle information, signal information, construction/traffic regulation information, traffic jam information, emergency vehicle information, and information on an accident history database as the estimation information. For example, the signal information includes a position information of a traffic light at the front side of the vehicle 2 in the traveling direction, signal cycle information on a lighting cycle of a blue signal, a yellow signal, and a red signal or a signal change timing, and the like. The wireless communication device 14 is electrically connected to the ECU 50, and outputs a signal on the estimation information to the ECU 50.

The database (hereinafter, referred to as a "DB" in some cases) 15 stores various information. The database 15 stores map information including road information, various information or learning information obtained from the actual traveling state of the vehicle 2, estimation information acquired by the wireless communication device 14, and the like. For example, the road information includes road slope information, road surface state information, road shape information, limited vehicle speed information, road curve information, temporary stop information, stop line position information, and the like. The information that is stored in the database 15 is appropriately referred to by the ECU 50, and necessary information is read. Furthermore, in the drawings, the database 15 is provided in the vehicle 2, but the present invention is not limited thereto. For example, a configuration may be employed in which the database is provided in the information center or the like outside the vehicle 2, is appropriately referred to by the ECU 50 via a wireless communication, and necessary information is read.

The ECU 50 is a control unit that entirely controls the vehicle control system 3, and is configured as, for example, an electronic circuit chiefly corresponding to a well-known microcomputer including a CPU, a ROM, a RAM, and an interface. The ECU 50 receives electric signals corresponding to the detection result detected by the vehicle speed sensor 10, the accelerator sensor 11, and the brake sensor 12, the GPS information acquired by the GPS device 13, the estimation information acquired by the wireless communication device 14, various information stored in the database 15, and the driving signals and the control instruction for respective units. The ECU 50 controls the HMI device 4, the engine 5, the MG 6, the transmission 7, the brake device 8, the battery 9, and the like in response to the electric signals input thereto. The ECU 50 controls the driving of the engine 5, the driving of the MG 6, the speed changing operation of the transmission 7, and the brake operation of the brake device 8 based on, for example, the accelerator opening degree, the vehicle speed, and the like. Further, the ECU 50 can realize various vehicle traveling operations (traveling modes) in the vehicle 2 by using one of or both the engine 5 and the MG 6 in response to, for example, the driving state.

Further, the ECU 50 can detect the ON/OFF state of the accelerator operation as the driver's acceleration request operation with respect to the vehicle 2 based on, for example, the detection result of the accelerator sensor 11. Similarly, the ECU 50 can detect the ON/OFF state of the brake operation as the driver's brake request operation with respect to the vehicle 2 based on, for example, the detection result obtained by the brake sensor 12. Furthermore, the state where the driver's accelerator operation is "OFF" indicates a state where the driver's acceleration request operation with respect to the vehicle 2 is canceled, and the state where the driver's accelerator operation is "ON" indicates a state where the driver's acceleration request operation with respect to the vehicle 2 is performed. Similarly, the state where the driver's brake operation is "OFF" indicates a state where the driver's brake request operation with respect to the vehicle 2 is canceled, and the state where the driver's brake operation is "ON" indicates a state where the driver's brake request operation with respect to the vehicle 2 is performed.

Then, the drive assisting device 1 includes the HMI device 4 and the ECU 50. The drive assisting device 1 performs an assistance operation of urging the driver to perform a driving with a high fuel economy improvement effect in a manner such that the ECU 50 controls the HMI device 4 in accordance with the situation and outputs various driving assistance information. The drive assisting device 1 performs a guide assistance operation of urging the driver to perform a recommended driving, that is, a driving changing according to a typical pattern in a manner such that the HMI device 4 outputs various driving assistance information in response to the control of the ECU 50 based on the target traveling state amount of the vehicle 2 (hereinafter, referred to as the "target traveling state amount" in some cases) in the traveling state. Here, the target traveling state amount typically indicates the target traveling state amount of the vehicle 2 at a predetermined position or a predetermining timing of the vehicle 2 in the traveling state. Typically, the drive assisting device performs a driving assistance operation of urging the driver to perform the recommended driving so that the traveling state amount of the vehicle 2 at a predetermined position becomes the target traveling state amount in a manner such that the ECU 50 controls the HMI device 4 based on the target traveling state amount at a predetermined position or a predetermining timing of the vehicle 2 and the HMI device 4 outputs the driving assistance information.

Then, the drive assisting device 1 of the embodiment outputs the driving assistance information so that the timing for urging the driver to perform the recommended driving is not a pinpoint timing and the timing for urging the driver to perform the recommended driving is a timing having a time width. Thus, the drive assisting device 1 realizes the appropriate driving assistance operation that suppresses the driver from feeling uncomfortable during the driving assistance operation. Furthermore, the drive assisting device 1 changes the form of urging the driver to perform the recommended driving in response to a change in time. Thus, the drive assisting device 1 can help the driver to easily feel the driving assistance operation by the drive assisting device 1 by causing the driver to easily understand that the timing for urging the recommended driving is the timing having a time width. As a result, the more appropriate driving assistance operation is realized.

The ECU 50 of the embodiment controls the HMI device 4 so as to change the form of the driving assistance information at the first period from the first assistance timing to the second assistance timing and the second period after the second assistance timing. The HMI device 4 outputs the driving assistance information as the first form at the first period from the first assistance timing to the second assistance timing. Meanwhile, the HMI device 4 outputs the driving assistance information as the second form different from the first form at the second period after the second assistance timing.

Here, both the first assistance timing and the second assistance timing are timings set based on the target traveling state amount, and the second assistance timing becomes the timing after the first assistance timing in time series. Typically, the first assistance timing is the assistance start timing, and the second assistance timing is the timing for switching the first form and the second form of the driving assistance information.

Then, one of the first assistance timing and the second assistance timing of the embodiment is determined based on the target traveling state amount at a predetermined position of the vehicle 2, and the other of the first assistance timing and the second assistance timing is determined based on one of the first assistance timing and the second assistance timing. Thus, the drive assisting device 1 suppresses the driver from feeling uncomfortable by suppressing a variation in transition time between the first assistance timing and the second assistance timing in response to the vehicle speed of the vehicle 2.

Hereinafter, an example of the schematic configuration of the ECU 50 will be described by referring to the block diagram of FIG. 2.

Here, as an example, the target traveling state amount is described as the target brake operation start vehicle speed corresponding to the recommended vehicle speed at which the driver's brake operation (the brake request operation) is recommended. Further, as an example, the recommended driving that guides and assists the driver by the drive assisting device 1 is described as the OFF operation for the driver's accelerator operation (the operation of canceling the acceleration request operation). In addition, as an example, the drive assisting device 1 outputs visual information as driving assistance information. The drive assisting device 1 is described such that a superimposed display is performed on a center meter constituting the HMI device 4, a head up display (HUD), and a windshield or visual information as driving assistance information is displayed on a visual information display device such as a liquid crystal display.

Specifically, as illustrated in FIG. 2, the ECU 50 includes a first information calculating unit 51, a second information calculating unit 52, and a vehicle control unit 53. The first information calculating unit 51 and the second information calculating unit 52 are, for example, calculating units corresponding to ITS (Intelligent Transport Systems), and are calculating units used for the corporation of the infra or NAVI. The vehicle control unit 53 is a control unit that controls the respective units of the vehicle 2. The vehicle control unit 53 is connected to sensors or an actuator ECU that controls various actuators such as an engine control ECU, a MG control ECU, a transmission control ECU, a brake control ECU, and a battery control ECU via a CAN (Control Area Network) 54 constructed as an in-vehicle network. Furthermore, the ECU 50 is not limited thereto, and may include, for example, a NAVI device instead of the first information calculating unit 51.

The first information calculating unit 51 calculates a remaining distance from the vehicle 2 to the temporary stop position or the curve entry position at the front side in the traveling direction based on the static infra information, for example, map information including road information. Further, the first information calculating unit 51 learns the driver's normal driving behavior, and estimates the driving behavior based on the learned result, so that the driver's deceleration stop behavior is learned and estimated. Then, the first information calculating unit 51 also calculates the deceleration stop position at the front side in the traveling direction from the vehicle 2 or the remaining distance to a position (hereinafter, referred to as the "deceleration stop position" in some cases) where the vehicle speed is decelerated to a predetermined speed. Here, the deceleration stop position which may be obtained by learning the driver's normal driving behavior is, for example, a position (for example, a position before a home garage or the like) where the vehicle highly frequently stops by the deceleration operation of the driver or a position (for example, a slow movement start position or the like) where the vehicle speed is highly frequently decelerated to a predetermined speed other than the temporary stop position or the curve entry position.

Furthermore, the first information calculating unit 51 may learn the driver's deceleration stop behavior, that is, the deceleration stop position in response to the driver based on various information obtained by the actual traveling state of the vehicle 2. The first information calculating unit 51 learns the driving habit or the driving tendency involved with the person (for example, the driver's attribute), the place (for example, the operation position or the like), the situation (for example, the time zone or the like), and the like from the driver's normal driving based on, for example, various information obtained from the actual traveling state of the vehicle 2. The first information calculating unit 51 learns the temporary stop position or the deceleration stop position where the driver highly frequently decelerates and stops the vehicle by statistically processing, for example, the ON/OFF states of the driver's accelerator operation and the brake operation. The first information calculating unit 51 stores the learned information as the learning information in the database 15.

The first information calculating unit 51 functionally and conceptually includes a position rating unit 51a, a temporary stop/curve information acquiring unit (hereinafter, referred to as a "temporary stop/curve information acquiring unit" in some cases) 51b, and a subtracting unit 51c. The position rating unit 51a acquires the GPS information via the GPS device 13 and acquires the current position information of the vehicle (the own vehicle) 2. The position rating unit 51a outputs the current position information to the temporary stop/curve information acquiring unit 51b and the subtracting unit 51c. The temporary stop/curve information acquiring unit 51b acquires the target position information indicating the temporary stop position located at the front side in the traveling direction of the vehicle 2, the curve entry position where the deceleration of the vehicle speed is expected, and the deceleration stop position where the vehicle speed is decelerated to a predetermined speed (which also includes the case of the speed=0) by referring to the map information stored in the database 15, various information obtained by the actual traveling state of the vehicle 2, or the learning information based on the current position information input from the position rating unit 51a. The temporary stop/curve information acquiring unit 51b outputs the target position information to the subtracting unit 51c. The subtracting unit 51c calculates a difference between the position of the vehicle 2 indicated by the current position information input from the position rating unit 51a and the position indicated by the target position information input from the temporary stop/curve information acquiring unit 51b, and calculates the remaining distance to the temporary stop position, the curve entry position, or the deceleration stop position. The subtracting unit 51c outputs the remaining distance information indicating the remaining distance to an adjusting unit 53a of the vehicle control unit 53.

The second information calculating unit 52 calculates the remaining distance to the stop position by the red signal at the front side in the traveling direction from the vehicle 2 based on the dynamic infra information, for example, the signal information or the like.

The second information calculating unit 52 functionally and conceptually includes a position rating unit 52a, a signal information acquiring unit 52b, and a subtracting unit 52c. The position rating unit 52a acquires the GPS information via the GPS device 13, and acquires the current position information of the vehicle (the own vehicle) 2. The position rating unit 52a outputs the current position information to the subtracting unit 52c. The signal information acquiring unit 52b acquires the signal information via the wireless communication device 14, and acquires the target position information indicating the stop position set by the red signal located at the front side in the traveling direction of the vehicle 2 based on the signal information. The signal information acquiring unit 52b outputs the target position information to the subtracting unit 52c. The subtracting unit 52c calculates a difference between the position of the vehicle 2 indicated by the current position information input from the position rating unit 52a and the stop position set by the red signal indicated by the target position information input from the signal information acquiring unit 52b, and calculates the remaining distance to the stop position set by the red signal. The subtracting unit 52c outputs the remaining distance information indicating the remaining distance to the adjusting unit 53a of the vehicle control unit 53.

The vehicle control unit 53 generally controls the braking/driving force of the vehicle 2 or the HMI device 4 based on the remaining distance calculated by the first information calculating unit 51, the remaining distance calculated by the second information calculating unit 52, the vehicle speed Vx of the vehicle 2, the accelerator operation ON/OFF state, the brake operation ON/OFF state, and the like.

The vehicle control unit 53 functionally and conceptually includes an adjusting unit 53a, a target calculating unit 53b, and a braking/driving force control unit 53c. The adjusting unit 53a adjusts the remaining distance information input from the subtracting unit 51c and the remaining distance information input from the subtracting unit 52c. The adjusting unit 53a adjusts the remaining distance information based on, for example, the accuracy of the remaining distance information or the magnitude relation of the remaining distance, and outputs the adjustment result to the target calculating unit 53b.

The target calculating unit 53b calculates the target traveling state amount based on the remaining distance information adjustment result input from the adjusting unit 53a and the vehicle speed Vx of the vehicle 2 input from the vehicle speed sensor 10 via the CAN 54. Then, the target calculating unit 53b controls the HMI device 4 based on the target traveling state amount. More specifically, the target calculating unit 53b calculates the first assistance timing and the second assistance timing for guiding and assisting the OFF operation of the accelerator operation by the HMI device 4 based on the target traveling state amount, controls the HMI device 4 in response to the calculation result, and outputs the driving assistance information.

The target calculating unit 53b of the ECU 50 of the embodiment determines the first assistance timing based on the target traveling state amount of the vehicle 2 at a predetermined position, and determines the second assistance timing based on the first assistance timing. Here, the first assistance timing is determined based on the target traveling state amount at a predetermined position with respect to the current traveling state amount of the vehicle 2. Here, as described above, the traveling state amount of the vehicle 2 is the vehicle speed, and the target traveling state amount is the target brake operation start vehicle speed as the recommended vehicle speed at which the driver's brake operation is recommended.

Specifically, the first assistance timing is the earliest timing at which the vehicle speed (the traveling state amount) of the vehicle 2 at a predetermined position becomes the target brake operation start vehicle speed (the target traveling state amount) at the latest time by the recommended driving, that is, the OFF operation of the accelerator operation performed by the driver. Meanwhile, the second assistance timing is the earlier timing of the latest timing at which the vehicle speed of the vehicle 2 at a predetermined position becomes the target brake operation start vehicle speed at the latest time by the OFF operation of the accelerator operation performed by the driver and the timing obtained by adding a predetermined time set in advance to the first assistance timing. That is, the ECU 50 sets the earliest timing as the first assistance timing, and sets the earlier timing of the latest timing and the timing obtained by adding a predetermined time to the first assistance timing as the second assistance timing. Here, the predetermined time that is added to the first assistance timing is set in advance so that any variation in the assistance period by the drive assisting device 1 is suppressed in response to, for example, the evaluation of the actual vehicle and the driver does not feel uncomfortable, and is stored in the storage unit of the ECU 50.

Furthermore, in the vehicle 2, the traveling state amount at a predetermined position substantially becomes the target traveling state amount in a manner such that the driver performs at least the recommended driving at the period from the earliest timing to the latest timing. That is, in the vehicle 2, the vehicle speed at a predetermined position substantially becomes the target brake operation start vehicle speed by the OFF operation of the accelerator operation performed by the driver at the period from the earliest timing to the latest timing. In other words, the period from the earliest timing to the latest timing is the optimal accelerator operation OFF period in which the vehicle speed at a predetermined position substantially becomes the target brake operation start vehicle speed. The drive assisting device 1 can perform the driving assistance operation so that the traveling state amount of the vehicle 2 becomes the target traveling state amount at a predetermined position and a predetermined timing by outputting the driving assistance information via the HMI device 4 to urge the recommended driving so that the driver performs the recommended driving at the period from the earliest timing to the latest timing.

Hereinafter, the calculation of the earliest timing and the latest timing will be described.

The earliest timing and the latest timing are typically calculated based on the target brake operation start vehicle speed (the recommended vehicle speed) at a predetermined position, the accelerator OFF deceleration speed as the operation canceling deceleration speed of the vehicle 2, and the target brake deceleration speed.

Here, the accelerator OFF deceleration speed corresponds to the deceleration speed of the vehicle 2 in the state where the acceleration request operation for the vehicle 2, that is, the driver's accelerator operation and brake operation are canceled (in the OFF state of the accelerator operation and the brake operation). The accelerator OFF deceleration speed is set to a fixed value in advance based on, for example, the engine brake torque generated by the rotation resistance of the engine 5, the TM brake torque generated by the rotation resistance of the transmission 7, and the motor regeneration torque generated in response to the regeneration amount of the MG 6 in the hybrid system similarly to the embodiment. Further, the target brake deceleration speed is the target deceleration speed of the vehicle 2 when the driver performs the brake operation. The target brake deceleration speed is set to a fixed value in advance in response to the deceleration speed in a degree that the driver does not feel a sudden brake operation and does not feel uncomfortable, for example, when the driver performs the ON operation of the brake operation. Here, since the vehicle control system 3 is the hybrid system, it is more desirable that the target brake deceleration speed is set to the deceleration speed having a slight margin with respect to the regeneration upper-limit deceleration speed at which the efficient regeneration can be performed by the MG 6. More specifically, it is desirable that the target brake deceleration speed is set in response to the deceleration speed capable of satisfying the deceleration speed requested in response to the driver's brake operation by the regenerative brake operation of the MG 6. In this case, the vehicle control system 3 as the hybrid system can stop the vehicle 2 at the stop position or the like by the regenerative brake operation of the MG 6 regardless of the friction brake operation performed by the brake device 8 when the deceleration speed requested in response to the driver's brake operation is equal to or slower than the target brake deceleration speed. In this case, the vehicle control system 3 can efficiently recycle the movement energy of the vehicle 2 as electric energy by the brake regeneration in response to the driver's brake operation without consuming the movement energy as the heat energy generated by the friction brake operation, and hence a high fuel economy improvement effect can be expected.

The target calculating unit 53b calculates the target brake operation start vehicle speed (the recommended vehicle speed) from the current vehicle speed, calculates a predetermined position from the target brake operation start vehicle speed and the target brake deceleration speed, calculates the accelerator OFF guide position from the predetermined position and the accelerator OFF deceleration speed, and calculates the earliest timing and the latest timing. The earliest timing and the latest timing of the embodiment are calculated based on the same accelerator OFF deceleration speed to a predetermined position, the same target brake deceleration speed, and the different target brake operation start vehicle speed based on the current vehicle speed of the vehicle 2. That is, the target calculating unit 53b calculates the earliest timing and the latest timing based on the same accelerator OFF deceleration speed to a predetermined position, the same target brake deceleration speed, and the different target brake operation start vehicle speed based on the current vehicle speed of the vehicle 2.

More specifically, the earliest timing is calculated based on the first predetermined position obtained in response to the target brake deceleration speed and the target brake operation start lower-limit vehicle speed as the lower-limit value of the target brake operation start vehicle speed based on the current vehicle speed of the vehicle 2 and the accelerator OFF deceleration speed to the first predetermined position. Meanwhile, the latest timing is calculated based on the accelerator OFF deceleration speed equal to the accelerator OFF deceleration speed to the first predetermined position and the second predetermined position different from the first predetermined position in response to the target brake deceleration speed and the target brake operation start upper-limit vehicle speed as the upper-limit value of the target brake operation start vehicle speed based on the current vehicle speed of the vehicle 2.

That is, the target calculating unit 53b calculates the first predetermined position from the target brake operation start lower-limit vehicle speed and the target brake deceleration speed, and calculates the earliest timing based on the first predetermined position and the accelerator OFF deceleration speed to the first predetermined position. The target calculating unit 53b calculates the second predetermined position from the target brake operation start upper-limit vehicle speed and the target brake deceleration speed, and calculates the latest timing based on the second predetermined position and the accelerator OFF deceleration speed equal to the accelerator OFF deceleration speed to the first predetermined position.

More specifically, the target calculating unit 53b calculates the target brake operation start lower-limit vehicle speed from the current vehicle speed, and calculates the target brake operation start latest position as the first predetermined position from the target brake operation start lower-limit vehicle speed and the target brake deceleration speed. Then, the target calculating unit 53b calculates the accelerator OFF guide earliest position from the target brake operation start latest position and the accelerator OFF deceleration speed, and calculates the earliest timing. Similarly, the target calculating unit 53b calculates the target brake operation start upper-limit vehicle speed from the current vehicle speed, and calculates the target brake operation start earliest position as the second predetermined position from the target brake operation start upper-limit vehicle speed and the target brake deceleration speed. Then, the target calculating unit 53b calculates the accelerator OFF guide latest position from the target brake operation start earliest position and the accelerator OFF deceleration speed, and calculates the latest timing.

Here, the target calculating unit 53b calculates the target brake operation start upper-limit vehicle speed by multiplying, for example, the current vehicle speed of the vehicle 2 by a predetermined upper-limit vehicle speed coefficient. Further, the ECU 50 calculates the target brake operation start lower-limit vehicle speed by multiplying the current vehicle speed of the vehicle 2 by a predetermined lower-limit vehicle speed coefficient smaller than the upper-limit vehicle speed coefficient. For example, the upper-limit vehicle speed coefficient is set to, for example, about 0.5 so that the target brake operation start upper-limit vehicle speed becomes the speed at which the driver of the vehicle 2 and the driver of the subsequent vehicle do not feel the sudden brake operation when the ON operation of the brake operation is performed. For example, the lower-limit vehicle speed coefficient is set to, for example, about 0.3 so that the target brake operation start lower-limit vehicle speed becomes the speed at which the driver of the vehicle 2 and the driver of the subsequent vehicle do not feel stress due to an excessively low vehicle speed of the vehicle 2 and the vehicle reaches the stop position when the ON operation of the brake operation is performed after the OFF operation of the accelerator operation is performed.

Further, the target brake operation start latest position corresponds to the brake operation start position where the vehicle 2 can be decelerated with respect to the temporary stop position, the curve entry position, the deceleration stop position, or the stop position set by the red signal (hereinafter, referred to as the "stop position or the like" in some cases) at the target brake deceleration speed when the driver performs the brake operation at the timing at which the vehicle speed of the vehicle 2 becomes the target brake operation start lower-limit vehicle speed. The target brake operation start earliest position corresponds to the brake operation start position where the vehicle 2 can be decelerated at the target brake deceleration speed with respect to the stop position or the like when the driver performs the brake operation at the timing at which the vehicle speed of the vehicle 2 becomes the target brake operation start upper-limit vehicle speed. In the vehicle 2, since the vehicle speed of the vehicle 2 becomes the target brake operation start vehicle speed at the target brake operation start position, the vehicle 2 can be decelerated at the target brake deceleration speed with respect to the stop position or the like when the driver performs the brake operation at the target brake operation start latest position and the target brake operation start vehicle speed. That is, the vehicle control system 3 can decelerate the vehicle 2 at the optimal target brake deceleration speed or less with respect to the stop position or the like when the driver starts the brake operation while the vehicle speed of the vehicle 2 is maintained in the range from the target brake operation start upper-limit vehicle speed to the target brake operation start lower-limit vehicle speed when the vehicle 2 is located in the section from the target brake operation start earliest position to the target brake operation start latest position.

Further, the accelerator OFF guide earliest position is the position at the earliest timing (the position closest to the current position of the vehicle 2) at which the vehicle speed of the vehicle 2 may be maintained in the range from the target brake operation start upper-limit vehicle speed to the target brake operation start lower-limit vehicle speed at a predetermined position, that is, the section from the target brake operation start earliest position to the target brake operation start latest position when the driver performs the OFF operation of the accelerator operation. The accelerator OFF guide latest position is the position at the latest timing (the position farthest from the current position of the vehicle 2) at which the vehicle speed of the vehicle 2 may be maintained in the range from the target brake operation start upper-limit vehicle speed to the target brake operation start lower-limit vehicle speed at a predetermined position, that is, the section from the target brake operation start earliest position to the target brake operation start latest position when the driver performs the OFF operation of the accelerator operation.

Then, the target calculating unit 53b of the embodiment sets the earliest timing calculated as described above as the first assistance timing, and sets the earlier timing of the latest timing and the timing obtained by adding a predetermined time set in advance to the first assistance timing as the second assistance timing. That is, the target calculating unit 53b sets the latest timing as the second assistance timing when the latest timing is earlier than the timing obtained by adding a predetermined time to the first assistance timing. Meanwhile, the target calculating unit 53b sets the timing obtained by adding a predetermined time to the first assistance timing as the second assistance timing when the timing obtained by adding a predetermined time to the first assistance timing is the timing earlier than the latest timing.

Then, the target calculating unit 53b changes the form of the driving assistance information with time at the first period from the first assistance timing to the second assistance timing. That is, the ECU 50 changes the form of the driving assistance information with time from the second assistance timing as the first assistance timing. Meanwhile, the target calculating unit 53b fixes the form of the driving assistance information at the second period after the second assistance timing. That is, the first form of the driving assistance information at the first period is the form that changes the driving assistance information with time. Meanwhile, the second form of the driving assistance information at the second period is the form that does not change the driving assistance information with time. Thus, the drive assisting device 1 performs the accelerator OFF guide assistance by urging the driver to perform the OFF operation of the accelerator operation in a manner such that the driving assistance information is displayed as an image on the HMI device 4 so that the driver performs the OFF operation of the accelerator operation at the first period from the first assistance timing to the second assistance timing.

Next, referring to FIGS. 3 to 6, the calculation of the first assistance timing and the second assistance timing by the target calculating unit 53b and an example of the guide assistance by the HMI device 4 will be described. Furthermore, in the examples of FIGS. 4 and 5, a case is described in which the driving assistance operation is performed with respect to the temporary stop position or the stop position set by the red signal as an example. However, the same applies to the case of the driving assistance operation with respect to the curve entry position where the driver's brake operation and the driver's deceleration operation are expected or the driving assistance operation with respect to the deceleration stop position where the vehicle speed is decelerated to a predetermined speed. However, in the case of the driver's driving assistance operation with respect to the curve entry position or the deceleration stop position, there is a difference in that the driver's brake operation ends while the vehicle speed of the vehicle 2 is larger than 0 compared to the examples of FIGS. 4 and 5 (the same applies to the following embodiments).

As illustrated in FIGS. 3, 4, and 5, the target calculating unit 53b first multiplies the current vehicle speed (the entry vehicle speed) V_now of the vehicle 2 by the predetermined upper-limit vehicle speed coefficient and the predetermined lower-limit vehicle speed coefficient so as to calculate the target brake operation start upper-limit vehicle speed V_b1 and the target brake operation start lower-limit vehicle speed V_b2 as the different target brake operation start vehicle speeds (the recommended vehicle speeds) (ST1).

Next, the target calculating unit 53b calculates the target brake operation start latest position X_b2 as the first predetermined position and the target brake operation start earliest position X_b1 as the second predetermined position based on the target brake operation start upper-limit vehicle speed V_b1, the target brake operation start lower-limit vehicle speed V_b2, and the target brake deceleration speed A_brake set in advance (ST2).

The target calculating unit 53b calculates the target brake operation start earliest position X_b1 based on the target brake operation start upper-limit vehicle speed V_b1 and the target brake deceleration speed A_brake by using the stop position set in response to the remaining distance adjusted by the adjusting unit 53a as the reference position. That is, the target calculating unit 53b reversely calculates the brake operation start position where the vehicle 2 can be stopped at the stop position when the vehicle 2 traveling at the target brake operation start upper-limit vehicle speed V_b1 is decelerated at the target brake deceleration speed A_brake by the brake operation, and sets the brake operation start position as the target brake operation start earliest position X_b1.

Similarly, the target calculating unit 53b calculates the target brake operation start latest position X_b2 based on the target brake operation start lower-limit vehicle speed V_b2 and the target brake deceleration speed A_brake by using the stop position set in response to the remaining distance adjusted by the adjusting unit 53a as the reference position. That is, the target calculating unit 53b reversely calculates the brake operation start position where the vehicle 2 can be stopped at the stop position when the vehicle 2 traveling at the target brake operation start lower-limit vehicle speed V_b2 is decelerated at the target brake deceleration speed A_brake by the brake operation, and sets the brake operation start position as the target brake operation start latest position X_b2.

The combination of the target brake operation start latest position X_b2 as the first predetermined position and the target brake operation start lower-limit vehicle speed V_b2 as the target traveling state amount corresponds to the combination of the brake operation start vehicle speed and the latest brake operation start position where the vehicle can approach the stop position at the optimal target brake deceleration speed A_brake when the driver performs the brake operation. The combination of the target brake operation start earliest position X_b1 as the second predetermined position and the target brake operation start upper-limit vehicle speed V_b1 as the target traveling state amount corresponds to the combination of the brake operation start vehicle speed and the earliest brake operation start position where the vehicle can approach the stop position at the optimal target brake deceleration speed A_brake when the driver performs the brake operation.

Next, the target calculating unit 53b calculates the accelerator OFF guide earliest position X_a1 and the accelerator OFF guide latest position X_a2 based on the target brake operation start earliest position X_b1, the target brake operation start latest position X_b2, and the prescribed accelerator OFF deceleration speed A_offbrake set in advance (ST3).

The target calculating unit 53b calculates the accelerator OFF guide earliest position X_a1 based on the accelerator OFF deceleration speed A_offbrake and the target brake operation start lower-limit vehicle speed V_b2 by using the target brake operation start latest position X_b2 as the reference position. That is, the target calculating unit 53b reversely calculates the accelerator operation OFF position where the vehicle speed of the vehicle 2 can become the target brake operation start lower-limit vehicle speed V_b2 at the target brake operation start latest position X_b2 when the vehicle 2 is decelerated from the current vehicle speed V_now to the accelerator OFF deceleration speed A_offbrake, and sets the accelerator operation OFF position as the accelerator OFF guide earliest position X_a1.

Similarly, the target calculating unit 53b calculates the accelerator OFF guide latest position X_a2 based on the accelerator OFF deceleration speed A_offbrake and the target brake operation start upper-limit vehicle speed V_b1 by using the target brake operation start earliest position X_b1 as the reference position. That is, the target calculating unit 53b reversely calculates the accelerator operation OFF position where the vehicle speed of the vehicle 2 can become the target brake operation start upper-limit vehicle speed V_b1 at the target brake operation start earliest position X_b1 when the vehicle 2 is decelerated from the current vehicle speed V_now to the accelerator OFF deceleration speed A_offbrake, and sets the accelerator operation OFF position as the accelerator OFF guide latest position X_a2.

Then, the target calculating unit 53b calculates the assistance limit position X_a3 where the vehicle 2 reaches after a predetermined time set in advance elapses from the earliest timing at which the arrival of the vehicle with respect to the accelerator OFF guide earliest position X_a1 at the current vehicle speed V_now is expected (ST4).

Then, the target calculating unit 53b determines whether the accelerator OFF guide latest position X_a2 obtained in response to the latest timing is located at the front side of the assistance limit position X_a3 (ST5). The target calculating unit 53b can determine the earlier timing of the latest timing and the timing obtained by adding a predetermined time to the first assistance timing when the earliest timing is set as the first assistance timing by determining whether the accelerator OFF guide latest position X_a2 obtained in response to the latest timing is located at the front side of the assistance limit position X_a3.

The target calculating unit 53b performs the following process when it is determined that the accelerator OFF guide latest position X_a2 is located at the front side of the assistance limit position X_a3 (ST5: Yes), that is, it is determined that the latest timing is the timing earlier than the timing obtained by adding a predetermined time to the first assistance timing in a case where the earliest timing is set as the first assistance timing. That is, as illustrated in FIG. 4, the target calculating unit 53b sets the earliest timing at which the vehicle 2 reaches the accelerator OFF guide earliest position X_a1 at the current vehicle speed as the first assistance timing, and sets the latest timing at which the vehicle reaches the accelerator OFF guide latest position X_a2 as the second assistance timing. Then, the target calculating unit 53b outputs the driving assistance information involved with the accelerator OFF guide assistance to the HMI device 4 at the first period from the first assistance timing to the second assistance timing, that is, the section from the accelerator OFF guide earliest position X_a1 to the accelerator OFF guide latest position X_a2. Then, the HMI device 4 displays the HMI involved with the accelerator OFF guide assistance as the driving assistance information (ST6), ends the current control period, and switches the current period to the next control period.

Meanwhile, the target calculating unit 53b performs the following process when it is determined that the assistance limit position X_a3 is located at the front side of the accelerator OFF guide latest position X_a2 (ST5: No), that is, it is determined that the timing obtained by adding a predetermined time to the first assistance timing is the timing earlier than the latest timing in a case where the earliest timing is set as the first assistance timing. That is, as illustrated in FIG. 5, the target calculating unit 53b sets the earliest timing at which the vehicle 2 reaches the accelerator OFF guide earliest position X_a1 at the current vehicle speed as the first assistance timing, and sets the timing at which the vehicle reaches the assistance limit position X_a3 as the second assistance timing. Then, the target calculating unit 53b outputs the driving assistance information involved with the accelerator OFF guide assistance to the HMI device 4 at the first period from the first assistance timing to the second assistance timing, that is, the section from the accelerator OFF guide earliest position X_a1 to the assistance limit position X_a3. Then, the HMI device 4 displays the HMI involved with the accelerator OFF guide assistance as the driving assistance information (ST7), ends the current control period, and switches the current period to the next control period.

The target calculating unit 53b of the embodiment changes the display form of the driving assistance information at the first period from the first assistance timing to the second assistance timing and the second period after the second assistance timing calculated as described above. In other words, the target calculating unit 53b changes the form of the driving assistance information from the first assistance timing to the second assistance timing and the form of the driving assistance information after the second assistance timing. That is, the target calculating unit 53b changes the display form of the driving assistance information before and after the second assistance timing on the basis of the second assistance timing.

Here, the first form of the driving assistance information at the first period is the form that changes and displays the driving assistance information with time. That is, the first period from the first assistance timing to the second assistance timing is the display change period in the driving assistance operation of the HMI device 4.

The target calculating unit 53b gradually changes the display form of the driving assistance information in the HMI device 4 as it goes from the first assistance timing to the second assistance timing at the first period. The target calculating unit 53b gradually changes a background color 55 of a vehicle icon of the center meter constituting the HMI device 4 as illustrated in the upper stage of FIGS. 4 and 5 or FIG. 6. For example, the target calculating unit 53b gradually changes the background color 55 from a colorless state to a dark orange or gradually widens the range of the background color 55 as it goes from the first assistance timing to the second assistance timing. In this way, the target calculating unit 53b realizes the first display form of the driving assistance information in the HMI device 4 at the first period from the first assistance timing to the second assistance timing. Thus, the drive assisting device 1 can urge the driver to perform the OFF operation of the accelerator operation in a euphemistic way at the first period from the first assistance timing to the second assistance timing.

Meanwhile, the second form of the driving assistance information at the second period is the display form that does not change the driving assistance information with time. That is, the second period after the second assistance timing is the display fixed period in the driving assistance operation of the HMI device 4. In this case, the target calculating unit 53b does not change the dark orange of the background color 55. In this way, the target calculating unit 53b realizes the second display form of the driving assistance information in the HMI device 4 at the second period after the second assistance timing. Thus, the drive assisting device 1 can urge the driver to perform the OFF operation of the accelerator operation in the stronger way at the second period after the second assistance timing.

Thus, the drive assisting device 1 can guide and assist the driver to perform the OFF operation of the accelerator operation at the first period from the first assistance timing to the second assistance timing. Accordingly, the drive assisting device 1 can guide and assist the timing of the OFF operation of the accelerator operation for the driver so that the vehicle speed is maintained at the target brake operation start vehicle speed, that is, the vehicle speed is maintained in the range from the target brake operation start upper-limit vehicle speed V_b1 to the target brake operation start lower-limit vehicle speed V_b2 when the vehicle 2 reaches a predetermined position, that is, the range from the target brake operation start earliest position X_b1 to the target brake operation start latest position X_b2. As a result, the drive assisting device 1 can appropriately guide the driver so that the deceleration speed requested in response to the brake operation becomes the optimal target brake deceleration speed A_brake or less when the driver actually performs the brake operation with respect to the deceleration stop position. Thus, the drive assisting device 1 can assist the driver so that the driver does not feel the sudden brake operation when the driver performs the ON operation of the brake operation, and hence a high fuel economy improvement effect can be also realized.

Then, the drive assisting device 1 of the embodiment can realize the appropriate driving assistance operation of suppressing the driver from feeling uncomfortable by outputting the driving assistance information so that the timing of urging the driver to perform the recommended driving (the OFF operation of the accelerator operation) has a time width. That is, since the drive assisting device 1 displays the driving assistance information by setting the timing of urging the driver to perform the OFF operation of the accelerator operation as a timing having a time width instead of a pinpoint timing, the drive assisting device can perform the driving assistance operation by estimating the reaction time and the like until the driver recognizes the display, determines the action, and actually performs the OFF operation of the accelerator operation. In actual, there is a difference in the reaction time until the OFF operation of the accelerator operation is performed depending on the drivers, and then there is a variation in reaction time depending on the peripheral traffic environment such as a driving load. However, since the drive assisting device 1 performs the driving assistance operation by setting the timing of urging the driver to perform the OFF operation of the accelerator operation as a timing having a time width, the drive assisting device can appropriately perform the driving assistance operation regardless of a variation in reaction time and the like.

Further, since the drive assisting device 1 performs the driving assistance operation by setting the timing of urging the driver to perform the OFF operation of the accelerator operation as a timing having a time width, the drive assisting device can suppress a variation in the predicted range even when a variation occurs in the actual timing of performing the OFF operation of the accelerator operation, and hence to suppress the influence on the operation or the control in later time as minimal as possible. Since the drive assisting device 1 guides and assists the OFF operation of the accelerator operation in the range of the first period from the first assistance timing to the second assistance timing, the drive assisting device can suppress the sudden brake operation when the ON operation of the brake operation is performed due to, for example, the high vehicle speed of the vehicle 2 at the front side of the stop position. Further, since the drive assisting device 1 guides and assists the OFF operation of the accelerator operation in the range of the first period from the first assistance timing to the second assistance timing, the drive assisting device can suppress the driver of the vehicle 2 or the driver of the subsequent vehicle from feeling stress due to, for example, the excessively low vehicle speed of the vehicle 2 at the front side of the stop position.

Here, since the drive assisting device 1 changes the assistance form used when urging the driver to perform the OFF operation of the accelerator operation with time from the first assistance timing, the driver can easily understand that the timing of urging the driver to perform the OFF operation of the accelerator operation has a time width. As a result, since the drive assisting device 1 can cause the driver to easily feel the driving assistance operation performed by the drive assisting device 1, the driving assistance operation can be more appropriately realized.

Then, the drive assisting device 1 of the embodiment sets the period from the first assistance timing as the earliest timing to the second assistance timing determined in response to the first assistance timing as the first period as the display change period. Thus, the drive assisting device 1 can suppress a large variation in the first assistance timing and the second assistance timing in response to the traveling state such as the vehicle speed of the vehicle 2, and hence can suppress the driver from feeling uncomfortable.

At this time, the drive assisting device 1 sets the first assistance timing as the earliest timing, and sets the second assistance timing as the earlier timing of the timing obtained by adding a predetermined time to the first assistance timing and the latest timing. Thus, the drive assisting device 1 can suppress a variation from occurring in the first period from the first assistance timing to the second assistance timing, and can set the first period within the range of the period from the earliest timing to the latest timing at which the vehicle speed at a predetermined position (the traveling state amount) substantially becomes the target brake operation start vehicle speed (the target traveling state amount) by at least the recommended driving performed by the driver. Thus, the drive assisting device 1 can suppress the sudden brake operation, for example, when the driver performs the ON operation of the brake operation with respect to the stop position or the like, and hence can suppress the absolute value of the deceleration speed of the vehicle 2 from becoming larger than the absolute value of the target brake deceleration speed.

Then, when the driver actually performs the OFF operation of the accelerator operation at the first period from the first assistance timing to the second assistance timing, the braking/driving force control unit 53c performs the braking/driving force control so that the actual deceleration speed of the vehicle 2 becomes the prescribed accelerator OFF deceleration speed A_offbrake. Here, since the vehicle control system 3 is the hybrid system, the braking/driving force control unit 53c performs the regenerative engine brake extension control that performs the engine brake regeneration by the MG 6 in addition to the normal engine brake and the like so that the deceleration speed becomes the prescribed accelerator OFF deceleration speed A_offbrake. Since the engine brake regeneration performed by the regenerative engine brake extension control has a small influence of the heat amount in the regeneration state compared to the brake regeneration in response to the driver's ON operation of the brake operation, there is a tendency that the regeneration efficiency is relatively improved. Thus, since the vehicle control system 3 can ensure the period of performing the regenerative engine brake extension control for a comparatively long period of time by guiding and assisting the OFF operation of the accelerator operation for the driver by the drive assisting device 1 at the appropriate timing, the higher fuel economy improvement effect can be expected.

Further, when the driver actually performs the OFF operation of the accelerator operation at the first period from the first assistance timing to the second assistance timing, the target calculating unit 53b outputs the driving assistance information indicating a state where the OFF operation of the accelerator operation is appropriately performed together with the regenerative engine brake extension control to the HMI device 4. As an example, the HMI device 4 changes the background color 55 to a green or the like so as to display a state where the accelerator OFF is appropriately performed as the driving assistance information to the HMI. Thus, the drive assisting device 1 can notify the traveling state contributing to the fuel economy improvement to the driver.

Furthermore, the vehicle control system 3 can obtain the fuel economy improvement effect even when the driver actually performs the OFF operation of the accelerator operation at the second period after the second assistance timing. In this case, there is a case where the vehicle control system 3 stops the vehicle 2 at the stop position by using the friction braking operation by the brake device 8 in addition to the regenerative braking operation by the MG 6 since, for example, the deceleration speed requested in response to the driver's brake operation becomes higher than the target brake deceleration speed A_brake. In this case, in the vehicle control system 3, the efficiency of recycling the movement energy of the vehicle 2 is slightly degraded because a part of the movement energy of the vehicle 2 is consumed as the heat energy by the friction braking operation. However, since the remaining movement energy of the vehicle 2 can still be recycled as the electric energy by the brake regeneration, a predetermined fuel economy improvement effect can be ensured.

According to the drive assisting device 1 of the embodiment described above, the drive assisting device includes the HMI device 4 that can output the driving assistance information for assisting the driving of the vehicle 2 and the ECU 50 that controls the HMI device 4 and changes the form of the driving assistance information at the period from the first assistance timing to the second assistance timing after the first assistance timing and the period after the second assistance timing. Then, one of the first assistance timing and the second assistance timing is determined based on the target brake operation start vehicle speed (the target traveling state amount) at a predetermined position of the vehicle 2, and the other of the first assistance timing and the second assistance timing is determined based on one of the first assistance timing and the second assistance timing.

Thus, since the drive assisting device 1 can assist the operation of driving the vehicle 2 so that the driver can easily understand the driving at the appropriate timing, the driving assistance operation can be appropriately performed. Accordingly, for example, the eco driving (eco drive) by the driver can be appropriately assisted, and hence the fuel consumption is suppressed. As a result, the fuel economy can be improved.

Furthermore, in the description above, the drive assisting device 1 has been described such that the vehicle 2 is the hybrid vehicle, but the present invention is not limited thereto. Even in the combination vehicle or the EV vehicle, the driving assistance operation can be appropriately performed.

Second Embodiment

Figure 7:
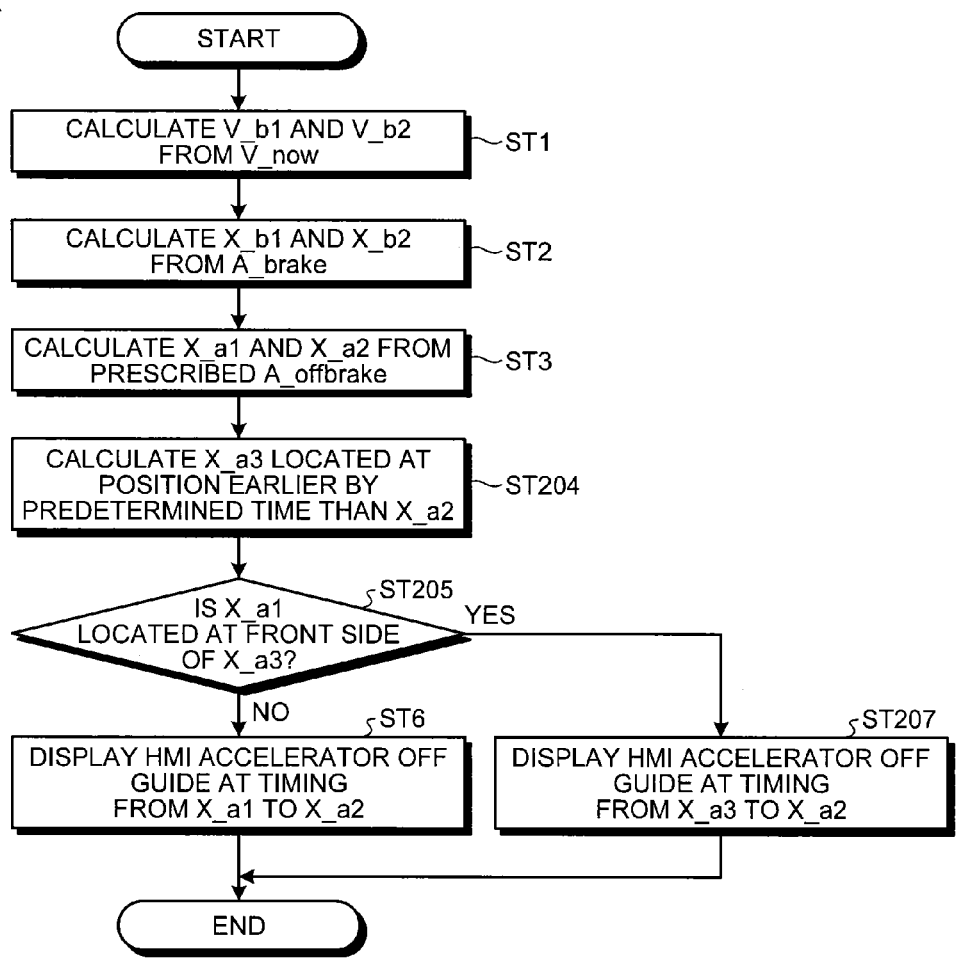
FIG. 7 is a flowchart illustrating an example of a control by an ECU according to a second embodiment.
Figure 8:
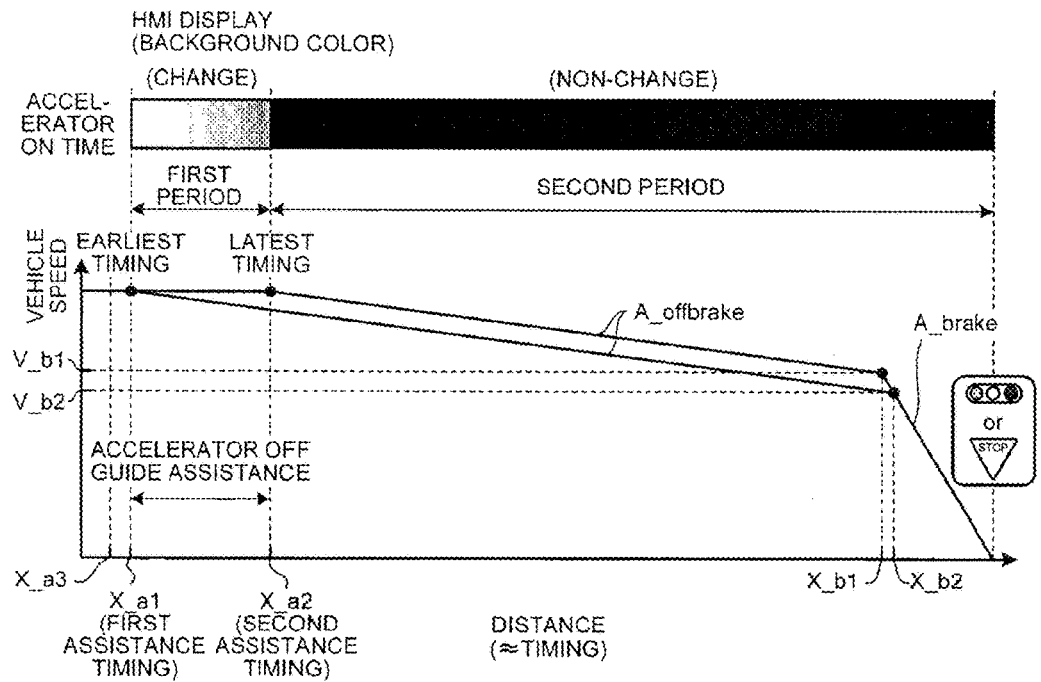
FIG. 8 is a schematic diagram illustrating a relation between a vehicle speed and a remaining distance to a stop position and an example of an assistance form in a vehicle control system according to the second embodiment.
Figure 9:
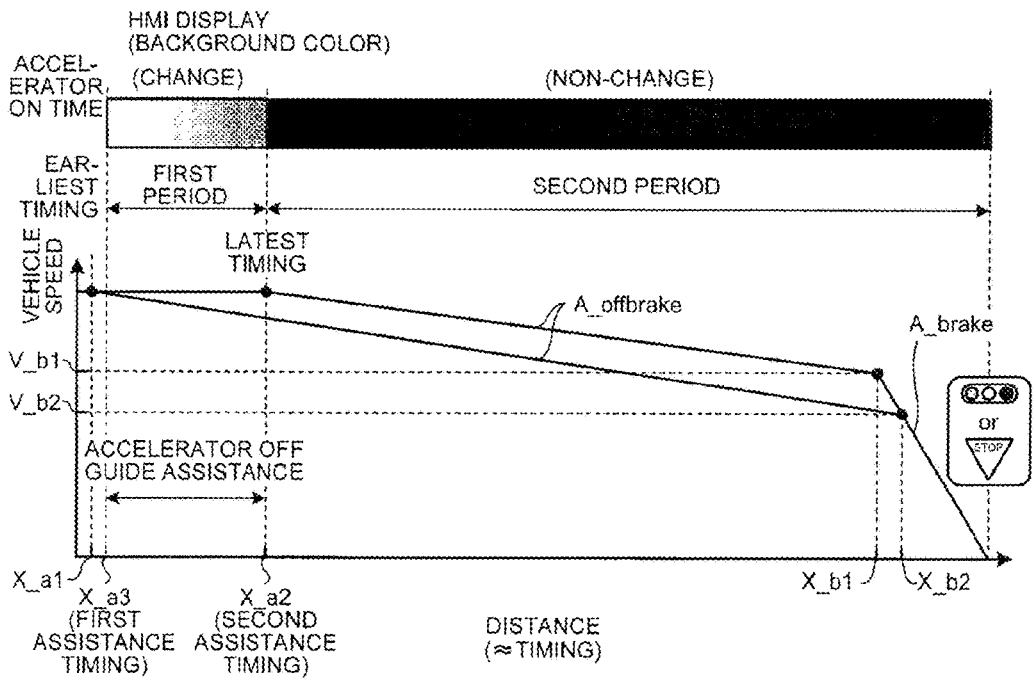
FIG. 9 is a schematic diagram illustrating a relation between the vehicle speed and the remaining distance to the stop position and an example of the assistance form in the vehicle control system according to the second embodiment.

FIG. 7 is a flowchart illustrating an example of a control by an ECU according to a second embodiment, and FIGS. 8 and 9 are schematic diagrams illustrating a relation between the vehicle speed and the remaining distance to the stop position in the vehicle control system according to the second embodiment and an example of the assistance form. The drive assisting device according to the second embodiment are different from that of the first embodiment in that the method of calculating the first timing and the second timing is different. In addition, the same description on the configuration, the operation, and the effect common to those of the above-described embodiment will not be repeated as much as possible. Further, the configurations of the drive assisting device according to the second embodiment will be described by referring to FIGS. 1 and 2 and the like (the same applies to the following description).

The target calculating unit 53b of a drive assisting device 201 according to the embodiment determines the second assistance timing based on the target traveling state amount at a predetermined position of the vehicle 2, and determines the first assistance timing based on the second assistance timing. Here, the second assistance timing is determined based on the target traveling state amount at a predetermined position with respect to the current traveling state amount of the vehicle 2.

Specifically, the second assistance timing is the latest timing at which the vehicle speed (the traveling state amount) of the vehicle 2 at a predetermined position becomes the target brake operation start vehicle speed (the target traveling state amount) at the latest time by the recommended driving, that is, the OFF operation of the accelerator operation performed by the driver. Meanwhile, the first assistance timing is the later timing of the earliest timing at which the vehicle speed of the vehicle 2 at a predetermined position becomes the target brake operation start vehicle speed at the earliest time by the OFF operation of the accelerator operation performed by the driver and the timing obtained by subtracting a predetermined time set in advance from the second assistance timing.

That is, the target calculating unit 53b sets the latest timing as the second assistance timing, and sets the later timing of the earliest timing and the timing obtained by subtracting a predetermined time set in advance from the second assistance timing as the first assistance timing. That is, the target calculating unit 53b sets the earliest timing as the first assistance timing when the earliest timing is the timing later than the timing obtained by subtracting a predetermined time set in advance from the second assistance timing. Meanwhile, the target calculating unit 53b sets the timing obtained by subtracting a predetermined time set in advance from the second assistance timing as the first assistance timing when the timing obtained by subtracting a predetermined time set in advance from the second assistance timing is the timing later than the earliest timing. Here, the predetermined time that is subtracted from the second assistance timing is set in advance so that any variation in the assistant period by the drive assisting device 1 is suppressed in response to, for example, the evaluation of the actual vehicle and the driver does not feel uncomfortable as described above, and is stored in the storage unit of the ECU 50.

Then, the target calculating unit 53b changes the form of the driving assistance information with time at the first period from the first assistance timing to the second assistance timing. Meanwhile, the target calculating unit 53b fixes the form of the driving assistance information at the second period after the second assistance timing. Thus, the drive assisting device 201 performs the accelerator OFF guide assistance by urging the driver to perform the OFF operation of the accelerator operation in a manner such that the driving assistance information is displayed as an image on the HMI device 4 so that the driver performs the OFF operation of the accelerator operation at the first period from the first assistance timing to the second assistance timing.

Next, referring to FIGS. 7 to 9, the calculation of the first assistance timing and the second assistance timing by the target calculating unit 53b and an example of the guide assistance by the HMI device 4 will be described. Even here, the same description as that of the first embodiment will not be repeated as much as possible.

As illustrated in FIGS. 7 to 9, after the process of ST3 is performed, the target calculating unit 53b calculates the assistance limit position X_a3 where the vehicle 2 may reach earlier by a predetermined time than the latest timing at which the vehicle is expected to reach the accelerator OFF guide latest position X_a2 at the current vehicle speed (ST204).

Then, the target calculating unit 53b determines whether the accelerator OFF guide earliest position X_a1 obtained in response to the earliest timing is located at the front side of the assistance limit position X_a3 (ST205). Since the target calculating unit 53b determines whether the accelerator OFF guide earliest position X_a1 obtained in response to the earliest timing is located at the front side of the assistance limit position X_a3, the target calculating unit can determine the later timing of the earliest timing and the timing obtained by subtracting a predetermined time from the second assistance timing when the latest timing is set as the second assistance timing.

The target calculating unit 53b performs the following process when it is determined that the assistance limit position X_a3 is located at the front side of the accelerator OFF guide earliest position X_a1 obtained in response to the earliest timing (ST205: No), that is, it is determined that the earliest timing is the timing later than the timing obtained by subtracting a predetermined time from the second assistance timing in a case where the latest timing is set as the second assistance timing. That is, as illustrated in FIG. 8, the target calculating unit 53b sets the earliest timing at which the vehicle 2 reaches the accelerator OFF guide earliest position X_a1 at the current vehicle speed as the first assistance timing, and sets the latest timing at which the vehicle reaches the accelerator OFF guide latest position X_a2 as the second assistance timing. Then, the target calculating unit 53b outputs the driving assistance information involved with the accelerator OFF guide assistance to the HMI device 4 at the first period from the first assistance timing to the second assistance timing, that is, the section from the accelerator OFF guide earliest position X_a1 to the accelerator OFF guide latest position X_a2. Then, the HMI device 4 displays the HMI involved with the accelerator OFF guide assistance as the driving assistance information (ST6), ends the current control period, and switches the current period to the next control period.

Meanwhile, the target calculating unit 53b performs the following process when it is determined that the accelerator OFF guide earliest position X_a1 obtained in response to the earliest timing is located at the front side of the assistance limit position X_a3 (ST205: Yes), that is, it is determined that the timing obtained by subtracting a predetermined time from the second assistance timing is the timing later than the earliest timing in a case where the latest timing is set as the second assistance timing. That is, as illustrated in FIG. 9, the target calculating unit 53b sets the timing at which the vehicle 2 reaches the assistance limit position X_a3 at the current vehicle speed as the first assistance timing, and sets the latest timing at which the vehicle reaches the accelerator OFF guide latest position X_a2 as the second assistance timing. Then, the target calculating unit 53b outputs the driving assistance information involved with the accelerator OFF guide assistance to the HMI device 4 at the first period from the first assistance timing to the second assistance timing, that is, the section from the assistance limit position X_a3 to the accelerator OFF guide latest position X_a2. Then, the HMI device 4 displays the HMI involved with the accelerator OFF guide assistance as the driving assistance information (ST207), ends the current control period, and switches the current period to the next control period.

Thus, the drive assisting device 201 can guide and assist the driver to perform the OFF operation of the accelerator operation at the first period from the first assistance timing to the second assistance timing.

Then, the drive assisting device 201 of the embodiment sets the period from the second assistance timing as the latest timing to the first assistance timing determined in response to the second assistance timing as the first period as the display change period. Thus, the drive assisting device 201 can suppress a large variation in the first assistance timing and the second assistance timing in response to the traveling state such as the vehicle speed of the vehicle 2, and hence can suppress the driver from feeling uncomfortable.

At this time, the drive assisting device 201 sets the second assistance timing as the latest timing, and sets the first assistance timing as the later timing of the timing obtained by subtracting a predetermined time from the second assistance timing and the earliest timing. Thus, the drive assisting device 201 can suppress a variation from occurring in the first period from the first assistance timing to the second assistance timing, and then can set the first period in the range of the period from the earliest timing to the latest timing at which the vehicle speed at a predetermined position (the traveling state amount) may substantially become the target brake operation start vehicle speed (the target traveling state amount) by at least the recommended driving performed by the driver. Thus, the drive assisting device 201 suppresses the vehicle speed of the vehicle 2 from being decelerated too much in the traveling state by performing the accelerator OFF operation after, for example, the driver performs the OFF operation of the accelerator operation, and hence can suppress a state from occurring where the vehicle 2 may not reach the stop position or the like in the end.

Since the drive assisting device 201 according to the above-described embodiment can assist the operation of driving the vehicle 2 by causing the driver to easily understand the assistance operation at the appropriate timing, the drive assisting device can appropriately assist, for example, the driver's eco driving (eco drive) and to suppress the fuel consumption. As a result, the fuel economy can be improved.

Third Embodiment

Figure 10:
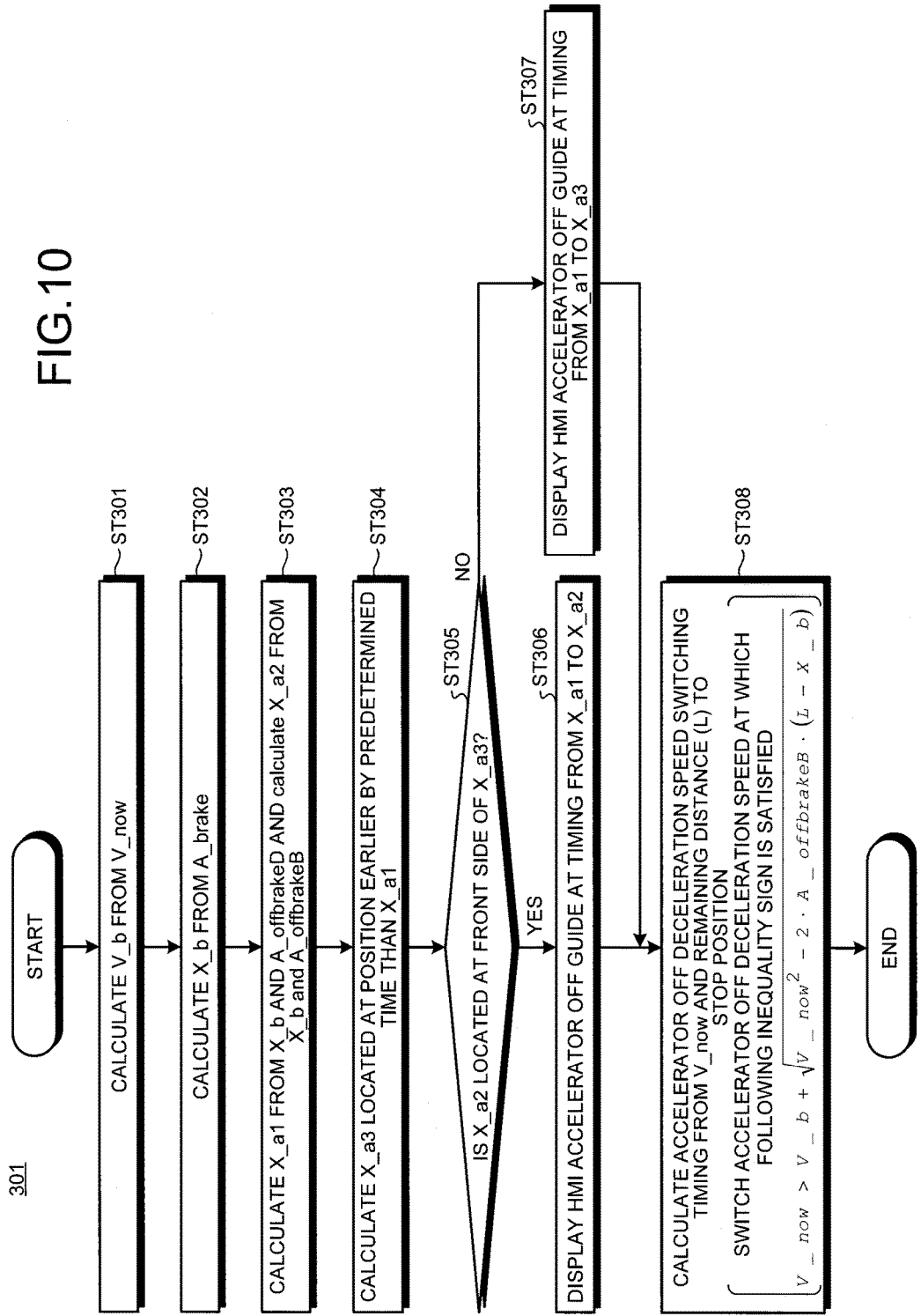
FIG. 10 is a flowchart illustrating an example of a control by an ECU according to a third embodiment.
Figure 11:
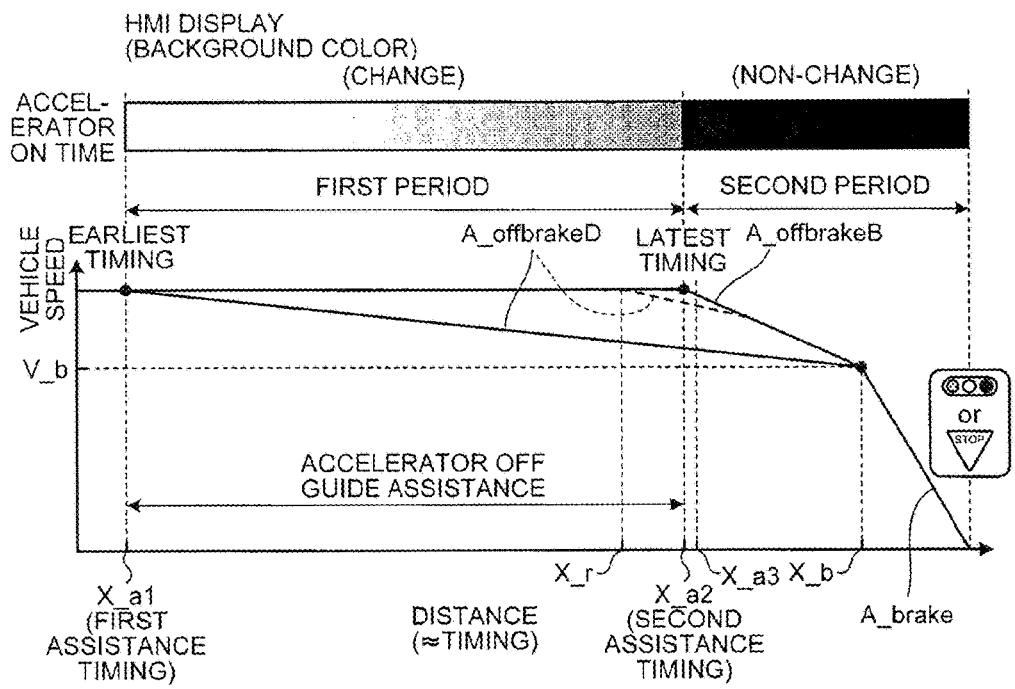
FIG. 11 is a schematic diagram illustrating a relation between a vehicle speed and a remaining distance to a stop position and an example of an assistance form in the vehicle control system according to the third embodiment.
Figure 12:
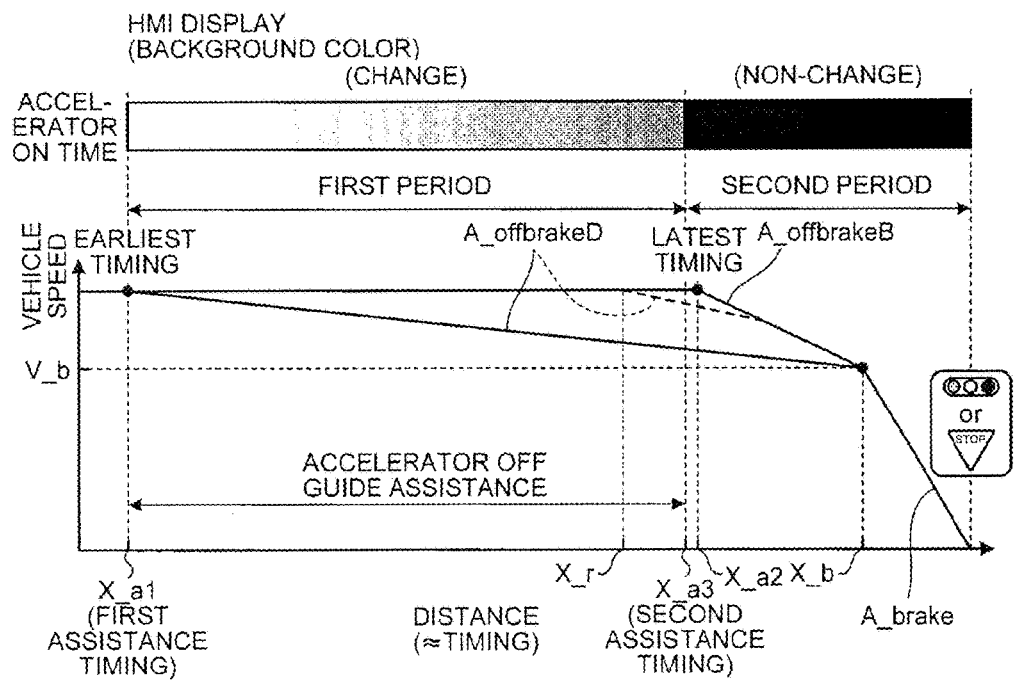
FIG. 12 is a schematic diagram illustrating a relation between the vehicle speed and the remaining distance to the stop position and an example of the assistance form in the vehicle control system according to the third embodiment.

FIG. 10 is a flowchart illustrating an example of a control by an ECU according to a third embodiment, and FIGS. 11 and 12 are schematic diagrams illustrating a relation between the vehicle speed and the remaining distance to the stop position in the vehicle control system according to the third embodiment and an example of the assistance form. The drive assisting device according to the third embodiment is different from that of the first embodiment in that the method of calculating the earliest timing and the latest timing is different.

The target calculating unit 53b of a drive assisting device 301 according to the embodiment determines the first assistance timing based on the target traveling state amount at a predetermined position of the vehicle 2, and determines the second assistance timing based on the first assistance timing.

Specifically, the ECU 50 sets the earliest timing as the first assistance timing, and sets the earlier timing of the latest timing and the timing obtained by adding a predetermined time set in advance to the first assistance timing as the second assistance timing. Then, in the drive assisting device 301 of the embodiment, the ECU 50 serves as not only the assistance control device but also the deceleration speed control device.

Hereinafter, the calculation of the earliest timing and the latest timing will be described.

Typically, the earliest timing and the latest timing are calculated based on the target brake operation start vehicle speed (the recommended vehicle speed) at a predetermined position, the accelerator OFF deceleration speed as the operation canceling deceleration speed of the vehicle 2, and the target brake deceleration speed. The target calculating unit 53b calculates the target brake operation start vehicle speed (the recommended vehicle speed) from the current vehicle speed, calculates a predetermined position from the target brake operation start vehicle speed and the target brake deceleration speed, and calculates the accelerator OFF guide position from the predetermined position and the accelerator OFF deceleration speed to thereby calculate the earliest timing and the latest timing.

The earliest timing and the latest timing of the embodiment are calculated based on the same target brake operation start vehicle speed, the same target brake deceleration speed, and the different accelerator OFF deceleration speed to a predetermined position based on the current vehicle speed of the vehicle 2. That is, the target calculating unit 53b calculates the earliest timing and the latest timing based on the same target brake operation start vehicle speed, the same target brake deceleration speed, and the different accelerator OFF deceleration speed to a predetermined position based on the current vehicle speed of the vehicle 2.

More specifically, the earliest timing is calculated based on a predetermined position obtained in response to the target brake deceleration speed and the target brake operation start vehicle speed based on the current vehicle speed of the vehicle 2 and the accelerator OFFD range deceleration speed (the accelerator OFF deceleration speed) as the first operation canceling deceleration speed of the vehicle 2 to the predetermined position. Meanwhile, the latest timing is calculated based on a predetermined position obtained in response to the target brake deceleration speed and the target brake operation start vehicle speed based on the current vehicle speed of the vehicle 2 and the accelerator OFFB range deceleration speed (the accelerator OFF deceleration speed) as the second operation canceling deceleration speed of the vehicle 2 to the predetermined position.

Here, the drive assisting device 301 can change the deceleration speed, that is, the accelerator OFF deceleration speed of the vehicle 2 in the state where the accelerator operation and the brake operation are maintained in the OFF state. As described above, the accelerator OFF deceleration speed is determined based on, for example, the engine brake torque generated by the rotation resistance of the engine 5, the TM brake torque generated by the rotation resistance of the transmission 7, and further the motor regeneration torque generated in response to the regeneration amount of the MG6 in the hybrid system of the embodiment. The drive assisting device 301 can change the accelerator OFF deceleration speed by changing, for example, the speed change ratio (the speed change stage) of the transmission 7 or the regeneration amount of the MG 6. The drive assisting device 301 of the embodiment gradually changes the accelerator OFF deceleration speed in a manner such that the ECU 50 gradually changes, for example, the speed change ratio (the speed change stage) of the transmission 7 or the regeneration amount of the MG 6. Here, the drive assisting device 301 can change at least the accelerator OFF deceleration speed into two stages, that is, the accelerator OFFD range deceleration speed and the accelerator OFFB range deceleration speed. The accelerator OFFD range deceleration speed corresponds to the accelerator OFF deceleration speed, for example, when a so-called drive range is selected as the shift range. The accelerator OFFB range deceleration speed corresponds to the accelerator OFF deceleration speed, for example, when a so-called brake range is selected as the shift range, and is the deceleration speed having an absolute value relatively larger than that of the accelerator OFFD range deceleration speed.

The drive assisting device 301 changes the accelerator OFF deceleration speed in response to the remaining distance to the stop position or the like at the timing of the actual OFF operation of the accelerator operation performed by the driver. Here, the ECU 50 changes the timing of changing the accelerator OFFD range deceleration speed and the accelerator OFFB range deceleration speed in response to the timing of the actual OFF operation of the accelerator operation performed by the driver. Thus, when the actual OFF operation of the accelerator operation is performed in the range of the first period from the first assistance timing to the second assistance timing, the drive assisting device 301 can set the combination of the actual brake operation start position and the brake operation start vehicle speed so as to be substantially the same state regardless of the timing of the OFF operation of the accelerator operation. In other words, even when a variation occurs in the timing of the actual OFF operation of the accelerator operation within the range of the first period from the first assistance timing to the second assistance timing, the drive assisting device 301 can set the appropriate combination of the actual brake operation start position and the brake operation start vehicle speed by adjusting the accelerator OFF deceleration speed.

The target calculating unit 53b of the embodiment calculates a predetermined position from the target brake operation start vehicle speed and the target brake deceleration speed, and calculates the earliest timing based on the predetermined position and the accelerator OFFD range deceleration speed to the predetermined position. Further, the target calculating unit 53b calculates the latest timing based on the predetermined position and the accelerator OFFB range deceleration speed to the predetermined position.

More specifically, the target calculating unit 53b calculates the target brake operation start vehicle speed from the current vehicle speed, and calculates the target brake operation start position as the predetermined position from the target brake operation start vehicle speed and the target brake deceleration speed. Then, the target calculating unit 53b calculates the accelerator OFF guide earliest position from the target brake operation start position and the accelerator OFFD range deceleration speed to thereby calculate the earliest timing. Meanwhile, the target calculating unit 53b calculates the accelerator OFF guide latest position from the target brake operation start position and the accelerator OFFB range deceleration speed to thereby calculate the latest timing.

Here, the target calculating unit 53b calculates the target brake operation start vehicle speed by multiplying, for example, the current vehicle speed of the vehicle 2 by a predetermined vehicle speed coefficient. For example, the vehicle speed coefficient is set so that the target brake operation start vehicle speed becomes the speed at which the driver of the vehicle 2 and the driver of the subsequent vehicle do not feel the sudden brake operation when the ON operation of the brake operation is performed and do not feel a stress due to the excessively low vehicle speed of the vehicle 2 until the vehicle reaches the stop position.

Further, the target brake operation start position corresponds to the brake operation start position where the vehicle 2 can be decelerated at the target brake deceleration speed with respect to the stop position or the like by the brake operation of the driver at the timing at which the vehicle speed of the vehicle 2 becomes the target brake operation start vehicle speed. That is, the vehicle control system 3 can decelerate the vehicle 2 at the optimal target brake deceleration speed or less with respect to the deceleration stop position in a manner such that the driver starts the brake operation while the vehicle speed of the vehicle 2 is the target brake operation start vehicle speed when the vehicle 2 is located at the target brake operation start position.

Then, the target calculating unit 53b of the embodiment sets the earliest timing calculated in this way as the first assistance timing, and sets the earlier timing of the latest timing and the timing obtained by adding a predetermined time set in advance to the first assistance timing as the second assistance timing.

Then, the target calculating unit 53b changes the form of the driving assistance information with time at the first period from the first assistance timing to the second assistance timing. Meanwhile, the target calculating unit 53b fixes the form of the driving assistance information at the second period after the second assistance timing. Thus, the drive assisting device 301 performs the accelerator OFF guide assistance by urging the driver to perform the OFF operation of the accelerator operation so that the driver performs the OFF operation of the accelerator operation at the first period from the first assistance timing to the second assistance timing in a manner such that the driving assistance information is displayed as an image on the HMI device 4.

Next, referring to FIGS. 10 to 12, the calculation of the first assistance timing and the second assistance timing by the target calculating unit 53b and an example of the guide assistance by the HMI device 4 will be described. Even here, the same description as that of the first embodiment will not be repeated as much as possible.

As illustrated in FIGS. 10 to 12, the target calculating unit 53b first multiplies the current vehicle speed (the entry vehicle speed) V_now of the vehicle 2 by the predetermined vehicle speed coefficient so as to calculate the target brake operation start vehicle speed V_b (ST301).

Next, the target calculating unit 53b calculates the target brake operation start position X_b as the predetermined position based on the target brake operation start vehicle speed V_b and the target brake deceleration speed A_brake set in advance (ST302).

The target calculating unit 53b calculates the target brake operation start position X_b based on the target brake operation start vehicle speed V_b and the target brake deceleration speed A_brake by using the stop position obtained in response to the remaining distance adjusted by the adjusting unit 53a as the reference position. That is, the target calculating unit 53b reversely calculates the brake operation start position where the vehicle 2 can be stopped at the stop position when the vehicle 2 traveling at the target brake operation start vehicle speed V_b is decelerated at the target brake deceleration speed A_brake due to the brake operation, and sets the brake operation start position as the target brake operation start position X_b. The combination of the target brake operation start position X_b as the predetermined position and the target brake operation start vehicle speed V_b as the target traveling state amount corresponds to the combination of the brake operation start vehicle speed and the brake operation start position where the vehicle can approach the stop position at the optimal target brake deceleration speed A_brake when the driver performs the brake operation.

Next, the target calculating unit 53b calculates the accelerator OFF guide earliest position X_a1 and the accelerator OFF guide latest position X_a2 based on the target brake operation start position X_b, the accelerator OFFD range deceleration speed A_offbrakeD, and the accelerator OFFB range deceleration speed A_offbrakeB (ST303).

The target calculating unit 53b calculates the accelerator OFF guide earliest position X_a1 based on the accelerator OFFD range deceleration speed A_offbrakeD and the target brake operation start vehicle speed V_b by using the target brake operation start position X_b as the reference position. That is, the target calculating unit 53b reversely calculates the accelerator operation OFF position where the vehicle speed of the vehicle 2 can become the target brake operation start vehicle speed V_b at the target brake operation start position X_b when the vehicle 2 is decelerated from the current vehicle speed V_now to the accelerator OFFD range deceleration speed A_offbrakeD, and sets the accelerator operation OFF position as the accelerator OFF guide earliest position X_a1.

Similarly, the target calculating unit 53b calculates the accelerator OFF guide latest position X_a2 based on the accelerator OFFB range deceleration speed A_offbrakeB and the target brake operation start vehicle speed V_b by using the target brake operation start position X_b as the reference position. That is, the target calculating unit 53b reversely calculates the accelerator operation OFF position where the vehicle speed of the vehicle 2 can become the target brake operation start vehicle speed V_b at the target brake operation start position X_b when the vehicle 2 is decelerated from the current vehicle speed V_now to the accelerator OFFB range deceleration speed A_offbrakeB, and sets the accelerator operation OFF position as the accelerator OFF guide latest position X_a2.

Then, the target calculating unit 53b calculates the assistance limit position X_a3 where the vehicle 2 may reach after a predetermined time set in advance elapses from the earliest timing at which the vehicle is expected to reach the accelerator OFF guide earliest position X_a1 at the current vehicle speed V_now (ST304).

Then, the target calculating unit 53b determines whether the accelerator OFF guide latest position X_a2 obtained in response to the latest timing is located at the front side of the assistance limit position X_a3 (ST305).

The target calculating unit 53b performs the following process when it is determined that the accelerator OFF guide latest position X_a2 is located at the front side of the assistance limit position X_a3 (ST305: Yes), that is, it is determined that the latest timing is the timing earlier than the timing obtained by adding a predetermined time to the first assistance timing in a case where the earliest timing is set as the first assistance timing. That is, as illustrated in FIG. 11, the target calculating unit 53b sets the earliest timing at which the vehicle 2 reaches the accelerator OFF guide earliest position X_a1 at the current vehicle speed as the first assistance timing, and sets the latest timing at which the vehicle reaches the accelerator OFF guide latest position X_a2 as the second assistance timing. Then, the target calculating unit 53b outputs the driving assistance information involved with the accelerator OFF guide assistance at the first period from the first assistance timing to the second assistance timing, that is, the section from the accelerator OFF guide earliest position X_a1 to the accelerator OFF guide latest position X_a2 to the HMI device 4. Then, the HMI device 4 displays the HMI involved with the accelerator OFF guide assistance as the driving assistance information (ST306).

Meanwhile, the target calculating unit 53b performs the following process when it is determined that the assistance limit position X_a3 is located at the front side of the accelerator OFF guide latest position X_a2 (ST305: No), that is, it is determined that the timing obtained by adding a predetermined time to the first assistance timing is the timing earlier than the latest timing when the earliest timing is set as the first assistance timing. That is, as illustrated in FIG. 12, the target calculating unit 53b sets the earliest timing at which the vehicle 2 reaches the accelerator OFF guide earliest position X_a1 at the current vehicle speed as the first assistance timing, and sets the timing at which the vehicle reaches the assistance limit position X_a3 as the second assistance timing. Then, the target calculating unit 53b outputs the driving assistance information involved with the accelerator OFF guide assistance at the first period from the first assistance timing to the second assistance timing, that is, the section from the accelerator OFF guide earliest position X_a1 to the assistance limit position X_a3 to the HMI device 4. Then, the HMI device 4 displays the HMI involved with the accelerator OFF guide assistance as the driving assistance information (ST307).

The target calculating unit 53b changes the display form of the driving assistance information at the first period from the first assistance timing to the second assistance timing and the second period after the second assistance timing calculated as described above. The first form of the driving assistance information at the first period is the display form that changes the driving assistance information with time. Meanwhile, the second form of the driving assistance information at the second period is the display form that does not change the driving assistance information with time. Thus, the drive assisting device 301 can guide and assist the OFF operation of the accelerator operation for the driver at the first period from the first assistance timing to the second assistance timing.

Then, when the driver actually performs the OFF operation of the accelerator operation at the first period from the first assistance timing to the second assistance timing after the process of ST306 or ST307, the braking/driving force control unit 53c of the ECU 50 controls the braking/driving force so that the deceleration speed of the actual vehicle 2 becomes the prescribed accelerator OFFD range deceleration speed A_offbrakeD. In the meantime, the braking/driving force control unit 53c performs the regenerative engine brake extension control of performing the engine brake regeneration by the MG 6 in addition to the normal engine brake and the like.

Then, the braking/driving force control unit 53c of the embodiment calculates the timing of changing the accelerator OFF deceleration speed based on the current vehicle speed V_now of the vehicle 2 and the remaining distance L to the stop position from the current position X_r at the timing at which the driver actually performs the OFF operation of the accelerator operation. The braking/driving force control unit 53c switches the accelerator OFF deceleration speed from the accelerator OFFD range deceleration speed A_offbrakeD to the accelerator OFFB range deceleration speed A_offbrakeB at the timing at which, for example, the inequality sign of the following equation (1) is satisfied. Then, the braking/driving force control unit 53c adjusts the actual deceleration speed of the vehicle 2 to become the accelerator OFFB range deceleration speed A_offbrakeB (ST308), ends the current control period, and switches the current period to the next control period.

$$V\_now > V\_b + \sqrt{V\_now^2 - 2 \cdot A\_offbrakeB \cdot (L - X\_b)} \quad (1)$$

In the above-described equation (1), [V_now] indicates the current vehicle speed of the vehicle 2 at which the driver performs the OFF operation of the accelerator operation. [V_b] indicates the target brake operation start vehicle speed. [A_offbrakeB] indicates the accelerator OFFB range deceleration speed. [L] indicates the remaining distance to the stop position from the current position at the timing at which the driver actually performs the OFF operation of the accelerator operation. [X_b] indicates the target brake operation start position.

The drive assisting device 301 with the above-described configuration can guide and assist the timing at which the driver performs the OFF operation of the accelerator operation so that the vehicle speed becomes the target brake operation start vehicle speed V_b when the vehicle 2 reaches the target brake operation start position X_b in a manner such that the driving assistance information is displayed as the first form at the first period from the first assistance timing to the second assistance timing. As a result, since the drive assisting device 301 can appropriately guide the driver so that the deceleration speed obtained in response to the brake operation becomes the optimal target brake deceleration speed A_brake or less when the driver actually performs the brake operation so as to stop at the stop position, a high fuel economy improvement effect can be realized.

Then, the drive assisting device 301 can set the appropriate combination of the actual brake operation start position and the brake operation start vehicle speed by adjusting the accelerator OFF deceleration speed even when a variation in the actual OFF operation of the accelerator operation occurs within the range of the first period from the first assistance timing to the second assistance timing. That is, when the actual OFF operation of the accelerator operation is performed within the range of the first period from the first assistance timing to the second assistance timing, the drive assisting device 301 can obtain substantially the same combination of the actual brake operation start position and the brake operation start vehicle speed regardless of the timing of the OFF operation of the accelerator operation. As a result, the drive assisting device 301 can suppress a variation from occurring in the combination of the actual brake operation start position and the brake operation start vehicle speed with respect to the combination of the target brake operation start position and the target brake operation start vehicle speed at which the driver can approach the stop position or the like at the optimal target brake deceleration speed A_brake when the driver performs the brake operation, and hence can suppress the driver from feeling uncomfortable.

Then, the drive assisting device 301 of the embodiment sets the period from the first assistance timing as the earliest timing to the second assistance timing determined in response to the first assistance timing as the first period as the display change period. Thus, the drive assisting device 301 can suppress a large variation in the first assistance timing and the second assistance timing in response to the traveling state such as the vehicle speed of the vehicle 2, and hence can suppress the driver from feeling uncomfortable.

At this time, the drive assisting device 301 sets the first assistance timing as the earliest timing, and sets the second assistance timing as the earlier timing of the timing obtained by adding a predetermined time to the first assistance timing and the latest timing. Thus, the drive assisting device 301 can suppress a variation from occurring in the first period from the first assistance timing to the second assistance timing, and can set the first period in the range of the period from the earliest timing to the latest timing at which the vehicle speed at a predetermined position (the traveling state amount) substantially becomes the target brake operation start vehicle speed (the target traveling state amount) when the driver performs at least the recommended driving. Thus, the drive assisting device 301 can suppress the sudden brake operation, for example, when the driver performs the ON operation of the brake operation with respect to the stop position or the like, and can suppress the absolute value of the deceleration speed of the vehicle 2 from becoming larger than the absolute value of the target brake deceleration speed.

Since the drive assisting device 301 according to the above-described embodiment can assist the operation of driving the vehicle 2 by causing the driver to easily understand the assistance operation at the appropriate timing, the driving assistance operation can be appropriately performed. Then, the eco driving (eco drive) is appropriately assisted by, for example, the driver, and hence the fuel consumption is suppressed, so that the fuel economy can be improved.

Furthermore, in the description above, a case has been described in which the drive assisting device 301 can change the accelerator OFF deceleration speed in two stages of the accelerator OFFD range deceleration speed and the accelerator OFFB range deceleration speed, but the present invention is not limited thereto. For example, a configuration can be employed in which the drive assisting device 301 continuously changes the accelerator OFF deceleration speed between the accelerator OFFD range deceleration speed and the accelerator OFFB range deceleration speed without any stage. In a case where the vehicle control system 3 that employs the drive assisting device 301 has a configuration in which the accelerator OFF deceleration speed is continuously changed without any stage in a manner such that the ECU 50 continuously changes the speed change ratio of the transmission 7, for example, a continuously variable transmission capable of changing the speed change ratio without any stage is used as the transmission 7.

In this case, when the driver actually performs the OFF operation of the accelerator operation at the first period from the first assistance timing to the second assistance timing, the braking/driving force control unit 53c controls the braking/driving force so that the actual deceleration speed of the vehicle 2 becomes the optimal deceleration speed between the accelerator OFFD range deceleration speed A_offbrakeD and the accelerator OFFB range deceleration speed A_offbrakeB. The braking/driving force control unit 53c calculates the target accelerator OFF deceleration speed based on the current vehicle speed V_now of the vehicle 2 and the remaining distance L to the stop position from the current position X_r at the timing at which the driver actually performs the OFF operation of the accelerator operation, and adjusts the actual accelerator OFF deceleration speed to become the target accelerator OFF deceleration speed. In the meantime, the braking/driving force control unit 53c performs the regenerative engine brake extension control of performing the engine brake regeneration by the MG 6 in addition to the normal engine brake or the like.

Fourth Embodiment

Figure 13:
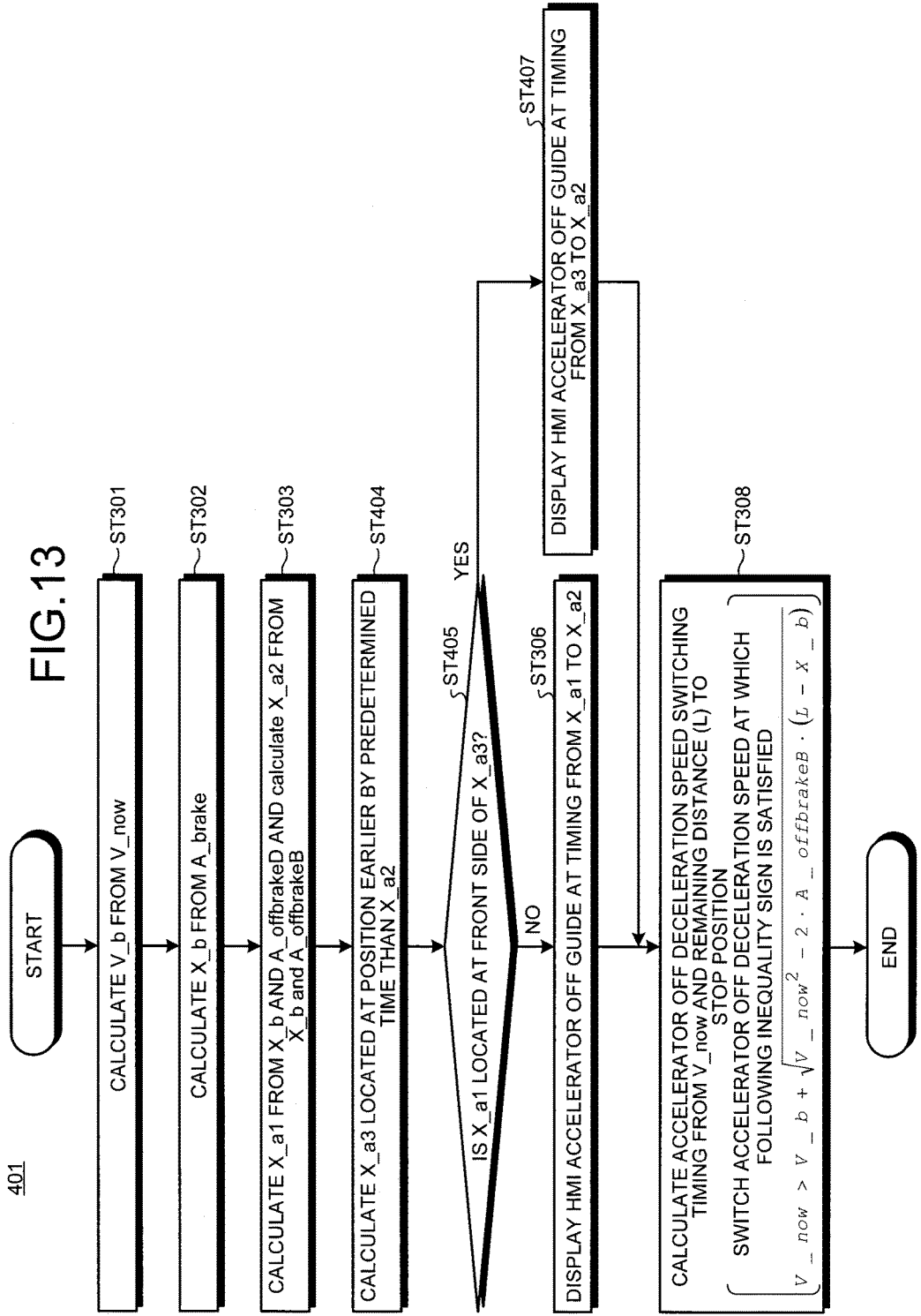
FIG. 13 is a flowchart illustrating an example of a control by an ECU according to a fourth embodiment.
Figure 14:
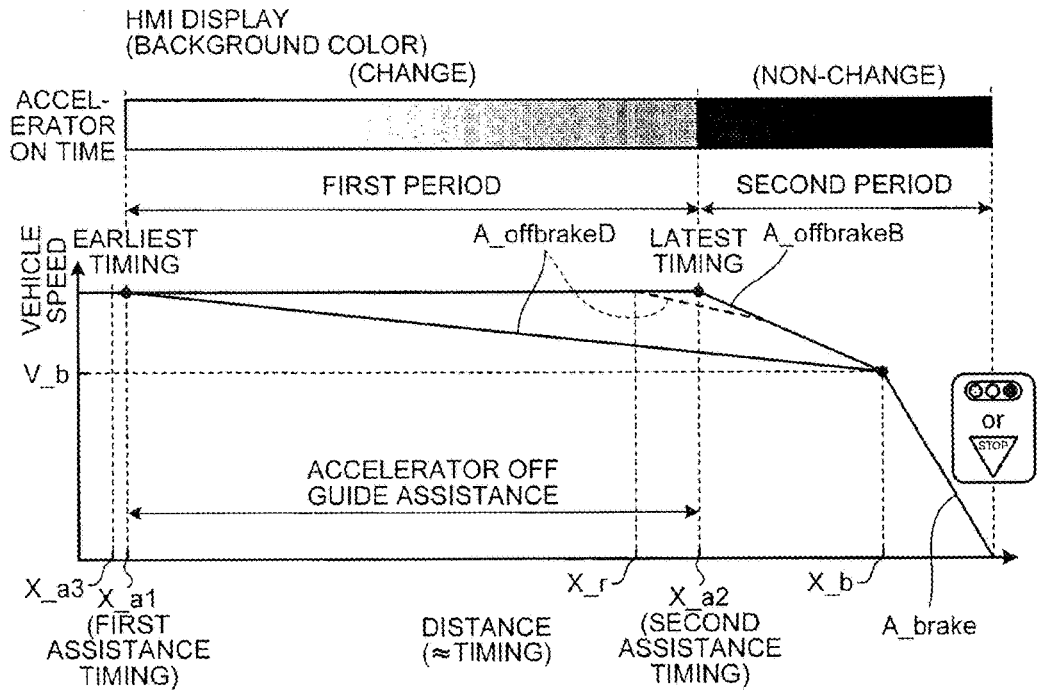
FIG. 14 is a schematic diagram illustrating a relation between a vehicle speed and a remaining distance to a stop position and an example of an assistance form in the vehicle control system according to the fourth embodiment.
Figure 15:
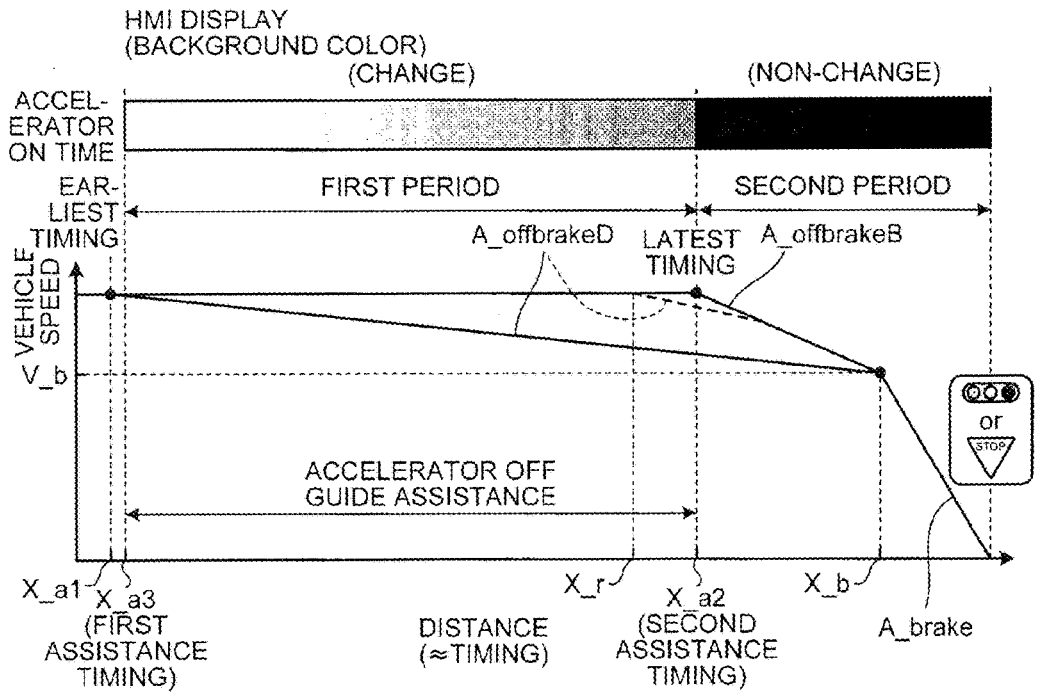
FIG. 15 is a schematic diagram illustrating a relation between the vehicle speed and the remaining distance to the stop position and an example of the assistance form in the vehicle control system according to the fourth embodiment.

FIG. 13 is a flowchart illustrating an example of a control of an ECU according to a fourth embodiment, and FIGS. 14 and 15 are schematic diagrams illustrating a relation between the vehicle speed and the remaining distance to the stop position in the vehicle control system according to the fourth embodiment and an example of the assistance form. The drive assisting device according to the fourth embodiment is different from that of the third embodiment in that the method of calculating the first timing and the second timing is different.

The target calculating unit 53b of a drive assisting device 401 according to the embodiment determines the second assistance timing based on the target traveling state amount at a predetermined position of the vehicle 2, and determines the first assistance timing based on the second assistance timing.

Specifically, the second assistance timing is the latest timing at which the vehicle speed (the traveling state amount) of the vehicle 2 at a predetermined position becomes the target brake operation start vehicle speed (the target traveling state amount) at the latest time by the recommended driving, that is, the OFF operation of the accelerator operation performed by the driver. Meanwhile, the first assistance timing is the later timing of the timing obtained by subtracting a predetermined time set in advance from the second assistance timing and the earliest timing at which the vehicle speed of the vehicle 2 at a predetermined position becomes the target brake operation start vehicle speed at the earliest time by the OFF operation of the accelerator operation performed by the driver. That is, the target calculating unit 53b sets the latest timing as the second assistance timing, and sets the later timing of the earliest timing and the timing obtained by subtracting a predetermined time set in advance from the second assistance timing as the first assistance timing.

Then, the target calculating unit 53b changes the form of the driving assistance information with time at the first period from the first assistance timing to the second assistance timing. Meanwhile, the target calculating unit 53b fixes the form of the driving assistance information at the second period after the second assistance timing. Thus, the drive assisting device 401 performs the accelerator OFF guide assistance by urging the driver to perform the OFF operation of the accelerator operation in a manner such that the driving assistance information is displayed as an image on the HMI device 4 so that the driver performs the OFF operation of the accelerator operation at the first period from the first assistance timing to the second assistance timing.

Next, referring to FIGS. 13 to 15, the calculation of the first assistance timing and the second assistance timing by the target calculating unit 53b and an example of the guide assistance by the HMI device 4 will be described. Even here, the same description as that of the third embodiment will not be repeated as much as possible.

As illustrated in FIGS. 13 to 15, after the process of ST303 is performed, the target calculating unit 53b calculates the assistance limit position X_a3 where the vehicle 2 can reach earlier by a predetermined time than the latest timing at which the vehicle is expected to reach the accelerator OFF guide latest position X_a2 at the current vehicle speed V_now (ST404).

Then, the target calculating unit 53b determines whether the accelerator OFF guide earliest position X_a1 obtained in response to the earliest timing is located at the front side of the assistance limit position X_a3 (ST405).

The target calculating unit 53b performs the following process when it is determined that the assistance limit position X_a3 is located at the front side of the accelerator OFF guide earliest position X_a1 in response to the earliest timing (ST405: No), that is, it is determined that the earliest timing is the timing later than the timing obtained by subtracting a predetermined time from the second assistance timing in a case where the latest timing is set as the second assistance timing. That is, as illustrated in FIG. 14, the target calculating unit 53b sets the earliest timing at which the vehicle 2 reaches the accelerator OFF guide earliest position X_a1 at the current vehicle speed as the first assistance timing, and sets the latest timing at which the vehicle reaches the accelerator OFF guide latest position X_a2 as the second assistance timing. Then, the target calculating unit 53b outputs the driving assistance information involved with the accelerator OFF guide assistance to the HMI device 4 at the first period from the first assistance timing to the second assistance timing, that is, the section from the accelerator OFF guide earliest position X_a1 to the accelerator OFF guide latest position X_a2. Then, the HMI device 4 displays the HMI involved with the accelerator OFF guide assistance as the driving assistance information (ST306).

Meanwhile, the target calculating unit 53b performs the following process when it is determined that the accelerator OFF guide earliest position X_a1 obtained in response to the earliest timing is located at the front side of the assistance limit position X_a3 (ST405: Yes), that is, it is determined that the timing obtained by subtracting a predetermined time from the second assistance timing is the timing later than the earliest timing in a case where the latest timing is set as the second assistance timing. That is, as illustrated in FIG. 15, the target calculating unit 53b sets the timing at which the vehicle 2 reaches the assistance limit position X_a3 at the current vehicle speed V_now as the first assistance timing, and sets the latest timing at which the vehicle reaches the accelerator OFF guide latest position X_a2 as the second assistance timing. Then, the target calculating unit 53b outputs the driving assistance information involved with the accelerator OFF guide assistance to the HMI device 4 at the first period from the first assistance timing to the second assistance timing, that is, the section from the assistance limit position X_a3 to the accelerator OFF guide latest position X_a2. Then, the HMI device 4 displays the HMI involved with the accelerator OFF guide assistance as the driving assistance information (ST407).

Thus, the drive assisting device 401 can guide and assist the OFF operation of the accelerator operation for the driver at the first period from the first assistance timing to the second assistance timing.

Then, the drive assisting device 401 of the embodiment sets the period from the second assistance timing as the latest timing to the first assistance timing determined in response to the second assistance timing as the first period as the display change period. Thus, the drive assisting device 401 can suppress a large variation in the first assistance timing and the second assistance timing in response to the traveling state such as the vehicle speed of the vehicle 2, and hence can suppress the driver from feeling uncomfortable.

At this time, the drive assisting device 401 sets the second assistance timing as the latest timing, and sets the first assistance timing as the later timing of the earliest timing and the timing obtained by subtracting a predetermined time from the second assistance timing. Thus, the drive assisting device 401 can suppress a variation from occurring in the first period from the first assistance timing to the second assistance timing and then can set the first period in the range of the period from the earliest timing to the latest timing at which the vehicle speed at a predetermined position (the traveling state amount) may substantially become the target brake operation start vehicle speed (the target traveling state amount) when the driver performs at least the recommended driving. Thus, the drive assisting device 401 suppresses the vehicle 2 from being decelerated too much in the traveling state of the accelerator OFF mode after, for example, the driver performs the OFF operation of the accelerator operation, and can suppress a state from occurring in which the vehicle 2 cannot reach the stop position or the like in the end.

Since the drive assisting device 401 according to the above-described embodiment can assist the operation of driving the vehicle 2 by causing the driver to easily understand the assistance operation at the appropriate timing, the driving assistance operation can be appropriately performed. Then, for example, the eco driving (eco drive) performed by the driver is appropriately assisted, and hence the fuel consumption is suppressed, so that the fuel economy can be improved.

Furthermore, the drive assisting device according to the above-described embodiments of the present invention is not limited to the above-described embodiments, and can be modified into various forms within the scope of claims. The drive assisting device according to the above-described embodiments may be configured by the appropriate combination of the components of the above-described embodiments.

In the description above, a case has been described in which the assistance control device and the deceleration speed control device are simultaneously configured by the ECU 50, but the present invention is not limited thereto. For example, the assistance control device and the deceleration speed control device may be respectively configured separately from the ECU 50 so that the information such as the detection signal, the driving signal, and the control instruction are transmitted therebetween.

In the description above, a case has been described in which the first form of the driving assistance information at the first period is the form that changes the driving assistance information with time and the second form of the driving assistance information at the second period is the form that does not change the driving assistance information with time, but the present invention is not limited thereto. The first form and the second form are not limited to the above-described examples, and may be formed as different forms.

In the description above, a case has been described in which the target traveling state amount is the target brake operation start vehicle speed as the recommended vehicle speed at which the driver's brake operation (the brake request operation) is recommended, but the present invention is not limited thereto. The target traveling state amount may be the target state amount indicating the vehicle's traveling state. For example, the target traveling state amount may be the target vehicle acceleration/deceleration speed, the target speed change ratio (the target speed change stage), the target operation angle, or the like.

In the description above, a case has been described in which the recommended driving that is guided and assisted for the driver by the drive assisting device, that is, the driving that is assisted by the drive assisting device is the OFF operation of the driver's accelerator operation (the operation of canceling the acceleration request operation), but the present invention is not limited thereto. The recommended driving that is guided and assisted for the driver by the drive assisting device may be, for example, the acceleration request operation, the brake request operation, the operation of canceling the brake request operation, the speed change operation, the steering operation, or the like.

In the description above, a case has been described in which the drive assisting device outputs the visual information as the driving assistance information, but the present invention is not limited thereto. The drive assisting device may output, for example, a voice information, a touch sensation information, or the like as the driving assistance information, and the forms of the voice information and the touch sensation information may be appropriately changed.

The above-described assistance control device may calculate the earliest timing and the latest timing based on the different recommended vehicle speed, the same vehicle's target deceleration speed, and the different vehicle's operation canceling deceleration speed to a predetermined position based on the current vehicle speed.

REFERENCE SIGNS LIST 1, 201, 301, 401 DRIVE ASSISTING DEVICE
2 VEHICLE
3 VEHICLE CONTROL SYSTEM
4 HMI DEVICE (ASSISTING DEVICE)
5 ENGINE (INTERNAL COMBUSTION ENGINE)
6 MOTOR GENERATOR, MG (MOTOR)
13 GPS DEVICE
14 WIRELESS COMMUNICATION DEVICE
15 DATABASE
50 ECU (ASSISTANCE CONTROL DEVICE)
51 FIRST INFORMATION CALCULATING UNIT
52 SECOND INFORMATION CALCULATING UNIT
53 VEHICLE CONTROL UNIT
54 CAN

The invention claimed is:

1. A drive assisting device comprising:
an assisting device configured to output driving assistance information for assisting driving of a vehicle; and
an assistance control device configured to:
control the assisting device, and
change an output form of the driving assistance information between a period from a first assistance timing to a second assistance timing after the first assistance timing and a period after the second assistance timing, wherein
one of the first assistance timing and the second assistance timing is determined based on a value of a target traveling state of the vehicle at a predetermined position of the vehicle, and
when the first assistance timing is determined based on the value of the target traveling state at the predetermined position, the second assistance timing is determined based on the determined first assistance timing,
when the second assistance timing is determined based on the value of the target traveling state at the predetermined position, the first assistance timing is determined based on the determined second assistance timing.

2. The drive assisting device according to claim 1, wherein
one of the first assistance timing and the second assistance timing is determined based on the value of the target traveling state at a predetermined position with respect to a value of a current traveling state of the vehicle.

3. The drive assisting device according to claim 1, wherein
the assistance control device controls the assisting device based on the value of the target traveling state of the vehicle at the predetermined position of the vehicle, and
the assisting device outputs the driving assistance information to perform a driving assistance operation of urging a recommended driving operation so that a value of a traveling state of the vehicle becomes the value of the target traveling state at the predetermined position of the vehicle.

4. The drive assisting device according to claim 3, wherein
the first assistance timing is an earliest timing at which the value of the traveling state of the vehicle becomes the value of the target traveling state at the predetermined position of the vehicle by performing the recommended driving operation, and
the second assistance timing is a latest timing at which the value of the traveling state of the vehicle becomes the value of the target traveling state at the predetermined position of the vehicle by performing the recommended driving operation or a timing obtained by adding a predetermined time set in advance to the first assistance timing, whichever is earlier.

5. The drive assisting device according to claim 3, wherein
the second assistance timing is a latest timing at which the value of the traveling state of the vehicle becomes the value of the target traveling state at the predetermined position of the vehicle by performing the recommended driving operation, and
the first assistance timing is an earliest timing at which the value of the traveling state of the vehicle becomes the value of the target traveling state at the predetermined position of the vehicle by performing the recommended driving operation or a timing obtained by subtracting a predetermined time set in advance from the second assistance timing, whichever is later.

6. The drive assisting device according to claim 4, wherein
the value of the target traveling state is a recommended vehicle speed at which a brake request operation with respect to the vehicle is recommended, and
the earliest timing and the latest timing are calculated based on the recommended vehicle speed, a deceleration speed at the time of canceling a vehicle operation of the vehicle in a state where an acceleration request operation and the brake request operation with respect to the vehicle are canceled, and a target deceleration speed of the vehicle at the time the brake request operation is performed.

7. The drive assisting device according to claim 6, wherein
the earliest timing is calculated based on a first predetermined position obtained in response to a lower-limit value of the recommended vehicle speed based on a current vehicle speed of the vehicle and the target deceleration speed of the vehicle, and on the deceleration speed at the time of canceling the vehicle operation to the first predetermined position, and
the latest timing is calculated based on a second predetermined position different from the first predetermined position obtained in response to an upper-limit value of the recommended vehicle speed based on the current vehicle speed of the vehicle and the target deceleration speed of the vehicle, and on the deceleration speed at the time of canceling the vehicle operation to the first predetermined position.

8. The drive assisting device according to claim 6, wherein
the earliest timing is calculated based on a predetermined position obtained in response to the recommended vehicle speed based on a current vehicle speed of the vehicle and the target deceleration speed of the vehicle, and on a deceleration speed at the time of canceling a first operation of the vehicle to the predetermined position, and the latest timing is calculated based on a predetermined position obtained in response to the recommended vehicle speed based on the current vehicle speed of the vehicle and the target deceleration speed of the vehicle, and on a deceleration speed at the time of canceling a second operation of the vehicle to the predetermined position having an absolute value larger than that of deceleration speed at the time of canceling the first operation of the vehicle.

9. The drive assisting device according to claim 1, wherein
the assistance control device changes the output form of the driving assistance information as time passes in the period from the first assistance timing to the second assistance timing.

10. A vehicle comprising:
a travel driving source;
an assisting device configured to output driving assistance information for assisting driving of the vehicle that is driven by a driving force generated by the travel driving source; and
an assistance control device configured to:
control the assisting device, and
change an output form of the driving assistance information between a period from a first assistance timing to a second assistance timing after the first assistance timing and a period after the second assistance timing, wherein
one of the first assistance timing and the second assistance timing is determined based on a value of a target traveling state of the vehicle at a predetermined position of the vehicle, and
when the first assistance timing is determined based on the value of the target traveling state at the predetermined position, the second assistance timing is determined based on the determined first assistance timing,
when the second assistance timing is determined based on the value of the target traveling state at the predetermined position, the first assistance timing is determined based on the determined second assistance timing.

11. The drive assisting device according to claim 2, wherein
the assistance control device controls the assisting device based on the value of the target traveling state of the vehicle at the predetermined position of the vehicle, and
the assisting device outputs the driving assistance information to perform a driving assistance operation of urging a recommended driving operation so that a value of a traveling state of the vehicle becomes the value of the target traveling state at the predetermined position of the vehicle.

12. The drive assisting device according to claim 5, wherein
the value of the target traveling state is a recommended vehicle speed at which a brake request operation with respect to the vehicle is recommended, and
the earliest timing and the latest timing are calculated based on the recommended vehicle speed, a deceleration speed at the time of canceling a vehicle operation of the vehicle in a state where an acceleration request operation and the brake request operation with respect to the vehicle are canceled, and a target deceleration speed of the vehicle at the time the brake request operation is performed.

13. The drive assisting device according to claim 2, wherein
the assistance control device changes the output form of the driving assistance information as time passes in the period from the first assistance timing to the second assistance timing.

14. The drive assisting device according to claim 3, wherein
the assistance control device changes the output form of the driving assistance information as time passes in the period from the first assistance timing to the second assistance timing.

15. The drive assisting device according to claim 4, wherein
the assistance control device changes the output form of the driving assistance information as time passes in the period from the first assistance timing to the second assistance timing.

16. The drive assisting device according to claim 5, wherein
the assistance control device changes the output form of the driving assistance information as time passes in the period from the first assistance timing to the second assistance timing.

17. The vehicle according to claim 10, wherein
the travel drive source includes an internal combustion engine and a motor.

18. The drive assisting device according to claim 1, wherein the driving assistance information includes at least one of visual information, voice information, and touch sensation information.

19. The drive assisting device according to claim 1, wherein the change of the output form of the driving assistance information includes a change of a background color of a vehicle icon.

20. A drive assisting device comprising:
processor circuitry configured to:
output driving assistance information for assisting driving of a vehicle, and
change an output form of the driving assistance information between a period from a first assistance timing to a second assistance timing after the first assistance timing and a period after the second assistance timing,
determine one of the first assistance timing and the second assistance timing based on a value of a target traveling state of the vehicle at a predetermined position of the vehicle,
when the first assistance timing is determined based on the value of the target traveling state at the predetermined position, determine the second assistance timing based on the determined first assistance timing, and
when the second assistance timing is determined based on the value of the target traveling state at the predetermined position, determine the first assistance timing based on the determined second assistance timing.

* * * * *